United States Patent
Lee et al.

(10) Patent No.: US 10,282,246 B2
(45) Date of Patent: May 7, 2019

(54) APPLICATION ERROR DETECTION METHOD FOR CLOUD STREAMING SERVICE, AND APPARATUS AND SYSTEM THEREFOR

(71) Applicant: SK TECHX CO., LTD., Seoul (KR)

(72) Inventors: Dong-su Lee, Seongnam-si (KR); Dong-gook Kim, Suwon-si (KR)

(73) Assignee: SK TECHX CO., LTD., Seoul (KR)

( * ) Notice: Subject to any disclaimer, the term of this patent is extended or adjusted under 35 U.S.C. 154(b) by 99 days.

(21) Appl. No.: 15/109,429

(22) PCT Filed: Dec. 10, 2014

(86) PCT No.: PCT/KR2014/012157
§ 371 (c)(1),
(2) Date: Jun. 30, 2016

(87) PCT Pub. No.: WO2015/108283
PCT Pub. Date: Jul. 23, 2015

(65) Prior Publication Data
US 2016/0328281 A1 Nov. 10, 2016

(30) Foreign Application Priority Data

Jan. 14, 2014 (KR) .................. 10-2014-0004400
Jan. 14, 2014 (KR) .................. 10-2014-0004600
(Continued)

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0712* (2013.01);
(Continued)

(58) Field of Classification Search
CPC .................................................. G06F 11/0763
(Continued)

(56) References Cited

U.S. PATENT DOCUMENTS

2007/0033441 A1\* 2/2007 Sathe ...................... G06F 11/36
714/38.14
2010/0306813 A1\* 12/2010 Perry ...................... A63F 13/10
725/114
(Continued)

FOREIGN PATENT DOCUMENTS

JP          10027148 A    1/1998
JP          10333931 A   12/1998
(Continued)

OTHER PUBLICATIONS

Japanese Office Action dated Jul. 5, 2017 from JPO in connection with the counterpart Japanese Patent Application No. 2016-547040, citing the above reference(s).
(Continued)

*Primary Examiner* — Sarai E Butler
(74) *Attorney, Agent, or Firm* — Brinks Gilson & Lione

(57) ABSTRACT

The present invention relates to an application error detection method for a cloud streaming service, and an apparatus and a system therefor. According to the present invention, with respect to an application executed in a streaming server, it is possible to detect an application error by determining whether a reference image coincides with an execution screen of the application.

11 Claims, 27 Drawing Sheets

(30) Foreign Application Priority Data

Apr. 22, 2014 (KR) .................. 10-2014-0048059
May 27, 2014 (KR) .................. 10-2014-0063782

(51) Int. Cl.
*G06F 11/277* (2006.01)
*G06F 11/32* (2006.01)

(52) U.S. Cl.
CPC ........ *G06F 11/0751* (2013.01); *G06F 11/277* (2013.01); *G06F 11/324* (2013.01)

(58) Field of Classification Search
USPC .................................................. 714/48, 49
See application file for complete search history.

(56) References Cited

U.S. PATENT DOCUMENTS

| | | | | |
|---|---|---|---|---|
| 2011/0276946 | A1* | 11/2011 | Pletter | G06F 11/3688 717/124 |
| 2012/0254664 | A1* | 10/2012 | Silva | H04N 17/004 714/32 |
| 2014/0325479 | A1* | 10/2014 | Barak | G06F 11/3688 717/124 |

FOREIGN PATENT DOCUMENTS

| | | |
|---|---|---|
| JP | 2004021523 A | 1/2004 |
| JP | 2009-49949 A | 3/2009 |
| JP | 2009-211363 A | 9/2009 |
| JP | 2011248597 A | 12/2011 |
| JP | 2013-65207 A | 4/2013 |
| JP | 5266416 B1 | 8/2013 |
| KR | 100877727 B1 | 1/2009 |
| KR | 1020100070895 A | 6/2010 |
| KR | 10-2011-0070438 A | 6/2011 |
| KR | 1020110098340 A | 9/2011 |
| KR | 101111956 B1 | 2/2012 |
| KR | 1020140099596 A | 8/2014 |

OTHER PUBLICATIONS

Extended European Search Report dated Sep. 7, 2017 from European Patent Office in connection with the counterpart European Patent Application No. 14879131.2, citing the above reference(s).
International Search Report dated Apr. 22, 2015 corresponding to International Application PCT/KR2014/012157 citing the above reference(s).

* cited by examiner

FIG. 7

```
<MAX-Condition>
    <CPU-usage/> 70
    <GPU-usage/> 70
    <Check-interval/> 3 seconds
</MAX-Condition>
<Test-StartSessionNum/>1
<Test-FinishSessionNum/>5
<Period/> 7 minutes
```

- 1210 — <CPU-usage/> 70
- 1220 — <GPU-usage/> 70
- 1230 — <Check-interval/> 3 seconds
- 1240 — <Test-StartSessionNum/>1
- 1250 — <Test-FinishSessionNum/>5
- 1260 — <Period/> 7 minutes

APPLICATION ERROR DETECTION METHOD FOR CLOUD STREAMING SERVICE, AND APPARATUS AND SYSTEM THEREFOR

CROSS REFERENCE TO RELATED APPLICATION

This application claims the priority of Korean Patent Application No. 10-2014-0004400, filed on Jan. 14, 2014, Korean Patent Application No. 10-2014-0004600, filed on Jan. 14, 2014, Korean Patent Application No. 10-2014-0048059, filed on Apr. 22, 2014, and Korean Patent Application No. 10-2014-0063782, filed on May 27, 2014 in the KIPO (Korean Intellectual Property Office). Further, this application is the National Phase application of International Application No. PCT/KR2014/012157 filed Dec. 10, 2014, which designates the United States and was published in Korean.

TECHNICAL FIELD

The present invention relates to a method of detecting an application error, and more particularly, to an application error detection method for a cloud streaming service, which may check whether a server that provides a cloud streaming service operates normally or has a failure by comparing application execution data executed in the server with a reference image, and an apparatus and system therefor.

This application claims priority to and the benefit of Korean Patent Application No. 10-2014-0004400, filed on Jan. 14, 2014, Korean Patent Application No. 10-2014-0004600, filed on Jan. 14, 2014, Korean Patent Application No. 10-2014-0048059, filed on Apr. 22, 2014, and Korean Patent Application No. 10-2014-0063782, filed on May 27, 2014, which are incorporated by reference herein in their entirety.

BACKGROUND ART

Cloud computing is an Internet based computer technology and refers to a computing service in which a user may use software through an Internet connection whenever necessary without installing the software in his or her computer and may also easily share expensive hardware needed to drive the software. That is, a person may connect to a web to use high-end software such as Photoshop or Office. In addition, data is stored on the web. As a result, several people may connect to one cloud computing server group and do their personal work.

Along with the development of a market for IT technology and applications, the amount of data processed by users through their personal terminal devices has significantly increased. In this case, a cloud computing system may be a solution to such an increase in the amount of data that needs to be processed. In addition, a cloud computing system may be a foundation of miniaturization of terminal devices.

For example, when software needing to process a large-scale image is executed, the software is executed through a cloud computing based server, and only an execution result screen is transmitted to a user's terminal using a streaming technology. Thus, the user may use high-end software through his or her terminal. That is, a technology through which the user sends only a request to execute software to a cloud computing server through the user's terminal device, and the cloud computing server provides the user with an execution screen for the software requested by the user through streaming is referred to as a cloud streaming service.

In order to provide such a cloud streaming service, a technology for inspecting whether an application is normally executed in the server or whether there is an error in the server is increasingly desperately needed.

Also, in order to provide the cloud streaming service, a cloud streaming server has to simultaneously execute a plurality of applications and provide results of the execution. In order to measure performance of a cloud streaming server, a conventional test scheme is performed by manually setting the number of applications being executed, executing an application through an input, observing a change in system resources used by people for a certain time, and increasing the number of applications. However, such a test scheme requires a lot of labor and has test errors that may frequently occur due to a manager's mistake. Accordingly, a new cloud streaming server test technology that may be performed automatically is increasingly desperately needed.

In addition, in a computing environment based on a cloud streaming service, main services or functions are executed by a server. Thus, the development of a technology for detecting a failure in the server is needed.

Furthermore, a new clouding streaming server management technology that may rapidly collect and reconstruct information regarding cloud streaming servers to resume a service although a problem has occurred in a cloud streaming management server is increasingly desperately needed.

DISCLOSURE

Technical Problem

The present invention is directed to providing a method of detecting an application error in an application executed in a streaming server by determining whether an application execution screen and a reference image match each other.

The present invention is also directed to providing an application error detection method that may detect an application error from a user's perspective by receiving application execution data of a streaming server through a virtual client module and detecting the application error using an application execution screen output from the virtual client module.

The present invention is also directed to providing an application error detection method that may more efficiently detect an application error by performing application error detection on only a key frame in an application execution screen.

The present invention is also directed to testing the optimal number of executable applications of a cloud streaming server.

The present invention is also directed to saving labor force and reducing test errors due to a manager's mistake by automating a test of a cloud streaming server with an automatic testing script.

The present invention is also directed to reducing an overall test time by finding a maximum load point at which system resource utilization is maximized during a test of a cloud streaming server and performing the test up to the maximum load point.

The present invention is also directed to providing a more efficient and appropriate service to a user by utilizing a test result of a cloud streaming server in a cloud streaming service.

The present invention is also directed to preventing a test error by capturing a test result screen at an appropriate timing when receiving test result screens from a plurality of cloud streaming servers and comparing the received test result screens to detect a failure that has occurred in a cloud streaming server.

The present invention is also directed to increasing reliability of a test by comparing regions having no differences with respect to the same input when comparing captured test result screens.

The present invention is also directed to efficiently managing cloud streaming servers using a cloud streaming management server.

The present invention is also directed to determining a representative server among cloud streaming servers and allowing the representative server to store a backup copy of information regarding the cloud streaming servers in the representative server.

The present invention is also directed to receiving a backup copy from a representative server and rapidly performing restoration when a problem has occurred in a database of a cloud streaming management server.

The present invention is also directed to resuming a service in as short a time as possible when the service is stopped due to a problem with a database of a cloud streaming management server.

Technical Solution

In order to achieve the above objectives, an application error detection apparatus for a cloud streaming service according to the present invention includes at least one virtual client module configured to output application execution data received from different streaming servers to a screen; a comparison unit configured to capture the application execution data output from the at least one virtual client module and compare a captured test image with a reference image; and a test control unit configured to determine whether a streaming server has a failure according to whether the test image and the reference image match each other.

The comparison unit may capture the application execution data output from any one of the at least one virtual client module and may set the captured data as the reference image.

The comparison unit may capture a key frame of the application execution data and may set the captured key frame as the reference image.

The comparison unit may capture a matching screen from the application execution data output from the at least one virtual client module and may set the captured screen as the reference image.

The comparison unit may capture a matching key frame from key frames of the application execution data output from the at least one virtual client module and may set the captured key frame as the reference image.

The test control unit may determine that the streaming server does not have a failure when the test image and the reference image match each other and may determine that the streaming server has a failure when the test image and the reference image do not match each other.

The virtual client module may output the application execution data including only a key frame.

An application error detection method for a cloud streaming service according to the present invention includes outputting application execution data received from at least one streaming server to a screen through at least one virtual client module; capturing the application execution data output from the at least one virtual client module by a detection server; comparing a captured test image with a reference image by the detection server; and determining whether the streaming server has a failure according to whether the test image and the reference image match each other by the detection server.

The step of comparing the test image with the reference image may include capturing application execution data output from any one of the at least one virtual client module and setting the captured data as the reference image.

The step of comparing the test image with the reference image may include capturing a key frame of the application execution data and setting the captured key frame as the reference image.

The step of comparing the test image with the reference image may include capturing a matching screen from the application execution data output from the at least one virtual client module and setting the captured screen as the reference image.

The step of determining whether the streaming server has a failure may include determining that the streaming server does not have a failure when the test image and the reference image match each other and determining that the streaming server has a failure when the test image and the reference image do not match each other.

The virtual client module may output the application execution data including only the key frame.

An application error detection system for a cloud streaming service according to the present invention includes at least one streaming server configured to transmit application execution data in order to test whether a streaming server has a failure; at least one virtual client module configured to receive the application execution data from different streaming servers and output the received application execution data to a screen; and a detection server configured to capture the application execution data output from the at least one virtual client module, compare a captured test image with a reference image; and determine whether the streaming server has a failure according to whether the test image and the reference image match each other.

In addition, in order to achieve the above objectives, a cloud streaming server test apparatus according to the present invention includes a test execution unit configured to repeatedly perform a test by automatically and repeatedly executing an automatic testing script corresponding to a test application to be tested according to a predetermined initial condition to execute one or more test applications; an application control unit configured to increase or decrease the number of applications being executed, which is the number of test applications being executed during the test each time the test is repeated; and an optimal application number calculation unit configured to end the test and calculate the optimal number of executable applications when it is determined that a test end condition is satisfied.

The initial condition may include one or more of maximum central processing unit (CPU) utilization, maximum graphics processing unit (GPU) utilization, a check interval of CPU utilization and GPU utilization, the initial number of test applications, the final number of test applications, and a test time.

The test execution unit may find a maximum load point at which system resource utilization is recorded as a maximum value during the test time and may reset the test time to a time at which the maximum load point is reached.

The system resource utilization may be determined in consideration of one or both of the CPU utilization and the GPU utilization.

The test execution unit may enter an application increasing test mode when the initial number of test applications is smaller than the final number of test applications.

The application increasing test mode may repeat the test while increasing the number of applications being executed each time when it is determined that the test end condition is not satisfied.

The test end condition may be satisfied when the CPU utilization and the GPU utilization are greater than a maximum CPU utilization and a maximum GPU utilization, respectively, or when the number of applications being executed is equal to the final number of test applications during the test time.

The optimal number of executable applications may be one less than the number of applications being executed when the test end condition is satisfied.

The test execution unit may enter an application decreasing test mode when the initial number of test applications is larger than the final number of test applications.

The application decreasing test mode may repeat the test while decreasing the number of applications being executed each time when it is determined that the test end condition is not satisfied.

The test end condition may be satisfied when the CPU utilization and the GPU utilization are equal to or less than the maximum CPU utilization and the maximum GPU utilization, respectively, or when the number of applications being executed is equal to the final number of test applications during the test time.

The optimal number of executable applications may be the number of applications being executed when the test end condition is satisfied.

A cloud streaming server test method according to the present invention includes setting an initial condition for executing an automatic testing script corresponding to a test application to be tested; repeatedly performing a test by automatically and repeatedly executing the automatic testing script to execute one or more test applications; increasing or decreasing the number of applications being executed, which is the number of test applications being executed during the test each time the test is repeated; ending the test when it is determined that a test end condition is satisfied; and calculating the optimal number of executable applications.

The initial condition may include one or more of maximum CPU utilization, maximum GPU utilization, a check interval of CPU utilization and GPU utilization, the initial number of test applications, the final number of test applications, and a test time.

The step of performing the test may include finding a maximum load point at which system resource utilization is recorded as a maximum value during the test time and resetting the test time to a time at which the maximum load point is reached.

The step of performing the test may include entering an application increasing test mode when the initial number of test applications is smaller than the final number of test applications.

In addition, in order to achieve the above objectives, a cloud streaming server test apparatus according to the present invention includes virtual client modules configured to receive test results corresponding to a predetermined test script key input from cloud streaming servers and generate test result videos; a comparison unit configured to generate reference regions to be compared among test result images generated by capturing the test result videos and compare the reference regions with each other; and a test control unit configured to determine whether one or more of the cloud streaming servers have failures according to a result of the comparison.

The comparison unit may select a reference server from among the cloud streaming servers and may compare a test result image generated by capturing a test result video corresponding to the reference server with test result images generated by capturing test result videos corresponding to other cloud streaming servers.

The test control unit may determine that the cloud streaming server does not have a failure when two images that are compared match each other and may determine that the cloud streaming server has a failure when the two images do not match each other.

The comparison unit may include a module control unit configured to perform control such that any one of the virtual client modules receives test results corresponding to a repetitive test script key input from any one of the cloud streaming servers and generates operation case videos; an operation case comparison unit configured to compare operation case images generated by capturing the operation case videos; and a reference generation unit configured to generate a reference region according to a result of the comparison between the operation case images.

The reference generation unit may detect a region having no differences and generate the region as the reference region by comparing the operation case images.

The module control unit may perform control such that the test results are received from the reference server.

The test result images corresponding to the other cloud streaming servers may be captured at the same time as the test result image corresponding to the reference server.

In addition, a cloud streaming server test method according to the present invention includes receiving test results transmitted from cloud streaming servers and generating test result videos by virtual client modules; generating reference regions to be compared when test result images are compared; comparing the reference regions with each other among test result images generated by capturing the test result videos; and determining that one or more of the cloud streaming servers have failures according to a result of the comparison.

The comparison step may include selecting a reference server from among the cloud streaming servers and comparing a test result image generated by capturing a test result video corresponding to the reference server with test result images generated by capturing test result videos corresponding to other cloud streaming servers.

The step of determining that one or more of the cloud streaming servers have failures may include determining that a cloud streaming server does not have a failure when two images that are compared match each other and determining that the cloud streaming server has a failure when the two images do not match each other.

The step of generating reference regions may include, by any one of the virtual client modules, receiving test results corresponding to a repetitive test script key input from any one of the cloud streaming servers and generating operation case videos; comparing operation case images generated by capturing the operation case videos; and generating a reference region according to a result of the comparison between the operation case images.

The step of generating a reference region according to a result of the comparison may include detecting a region having no differences and generating the region as the reference region by comparing the operation case images.

The step of generating the operation case videos may include receiving the test results from the reference server.

In addition, a cloud streaming server test system according to the present invention includes cloud streaming servers configured to transmit test results corresponding to a predetermined test script key input in order to test a failure; and a test apparatus configured to generate reference regions to be compared among test result images generated by capturing test result videos and compare the reference regions to determine whether one or more of the cloud streaming servers have failures.

In addition, in order to achieve the above objectives, a cloud streaming management server according to the present invention includes a monitoring unit configured to monitor real-time load information of a plurality of cloud streaming servers; a storage unit configured to store properties of the plurality of cloud streaming servers; a representative server determination unit configured to determine a representative server and a subordinate server among the plurality of cloud streaming servers based on the real-time load information; and a restoration unit configured to receive a backup copy of the property from the representative server and restore the storage unit when a problem has occurred in the storage unit.

The representative server may receive a property from the subordinate server and may store a backup copy of the received property.

The representative server determination unit may transmit a subordinate server list to the representative server so that the representative server requests a backup copy of the property of the subordinate server.

The representative server determination unit may divide the plurality of cloud streaming servers into a plurality of groups and may determine a representative server and a subordinate server for each group based on the real-time load information In addition, a cloud streaming server according to the present invention includes a storage unit configured to store a property of a cloud streaming server; a communication unit configured to transmit the property to one or both of a representative server and a cloud streaming management server; and a control unit configured to control the transmission of the property according to a load of the cloud streaming server when a request is received from the representative server.

When the cloud streaming server is determined as the representative server by the cloud streaming management server, the storage unit may further store a backup copy of a property of a subordinate server and the communication unit may receive a request from the cloud streaming management server and transmits the backup copy.

The cloud streaming server may receive a subordinate server list from the cloud streaming management server and may request the subordinate server to transmit the backup copy.

The control unit may perform control such that the property is transmitted to the representative server and the cloud streaming management server when the load is lower than a predetermined level and may perform control such that the property is transmitted to only the representative server when the load is not lower than the predetermined level.

In addition, a cloud streaming server management method according to the present invention includes monitoring real-time load information of a plurality of cloud streaming servers; storing properties of the plurality of cloud streaming servers; determining a representative server and a subordinate server among the plurality of cloud streaming servers based on the real-time load information; detecting whether a problem has occurred in the stored property; and receiving a backup copy of the property from the representative server and restoring the stored property when the problem has occurred in the storage unit.

The step of determining the representative server and the subordinate server may include transmitting a subordinate server list to the representative server in order to enable the representative server to request a backup copy of a property of the subordinate server.

The step of determining the representative server and the subordinate server may include dividing the plurality of cloud streaming servers into a plurality of groups and determining a representative server and subordinate servers for each group based on the real-time load information.

In addition, a cloud streaming server management method according to the present invention includes storing a property of a cloud streaming server; receiving a request for the property from a representative server; controlling a transmission of the property according to a load of the cloud streaming server; and transmitting the property to one or both of the representative server and a cloud streaming management server.

The cloud streaming server management method may further include storing a backup copy of a property of a subordinate server; receiving a request from the cloud streaming management server; and transmitting the backup copy.

The step of storing the backup copy may include receiving a subordinate server list from the cloud streaming management server and requesting the subordinate server to transmit the backup copy.

The control step may include performing control such that the property is transmitted to the representative server and the cloud streaming management server when the load is lower than a predetermined level and performing control such that the property is transmitted to only the representative server when the load is not lower than the predetermined level.

In addition, a cloud streaming management system according to the present invention includes a plurality of cloud streaming servers configured to transmit a property of a cloud streaming server to one or both of a representative server and a cloud streaming management server, and store a backup copy of a property of a subordinate server and transmit the backup copy to the cloud streaming server when the cloud streaming server is determined as the representative server by the cloud streaming management server; and a cloud streaming management server configured to store properties of the plurality of cloud streaming servers, determine the representative server and the subordinate server, and receive the backup copy of the property from the representative server and perform restoration when a problem has occurred in the storage of the property.

Advantageous Effects

According to the present invention, it is possible to detect an application error from an application executed in a streaming server by determining whether an application execution screen and a reference image match each other.

According to the present invention, it is also possible to detect an application error from a user's perspective by receiving application execution data of a streaming server through a virtual client module and detecting the application error using an application execution screen output from the virtual client module.

According to the present invention, it is also possible to more efficiently detect an application error by performing application error detection on only a key frame in an application execution screen.

According to the present invention, it is also possible to test for the optimal number of executable applications of a cloud streaming server.

Also, the present invention can save labor force and reduce test errors due to a manager's mistake by automating a test of a cloud streaming server with an automatic testing script.

Also, the present invention can reduce an overall test time by finding a maximum load point at which system resource utilization is maximized during a test of a cloud streaming server and performing the test up to the maximum load point.

Also, the present invention can provide a more efficient and appropriate service to a user by utilizing a test result of a cloud streaming server in a cloud streaming service.

In addition, in order to test whether a server for providing a cloud streaming service operates normally, the present invention includes at least one virtual client module having at least some functions of an actual client terminal and can easily detect a failure of the cloud streaming server by receiving a predetermined test result transmitted from at least one cloud streaming server through at least one virtual client module and outputting the received test result to a screen, capturing a result image output from the at least one virtual client module, comparing the captured result image with a predetermined reference image, and determining whether the cloud streaming server operates normally according to whether the compared images are the same.

It is also possible to prevent, in advance, a data transmission error of a cloud streaming server by checking whether the server operates normally, as described above.

In addition, the present invention can enhance service quality by detecting, in advance, a failure of a server that provides a cloud streaming service to reliably provide the cloud streaming service.

The present invention can prevent an error from occurring in a test result by comparing regions having no differences with respect to the same input when comparing captured test result screens.

According to the present invention, it is also possible to efficiently manage cloud streaming servers using a cloud streaming management server.

According to the present invention, it is also possible to determine a representative server among cloud streaming servers and store a backup copy of information about the cloud streaming server in the representative server.

According to the present invention, it is also possible to receive the backup copy from the representative server and rapidly perform restoration when a problem has occurred in a database of a cloud streaming management server.

According to the present invention, it is also possible to resume a service in as short a time as possible when the service is stopped due to a problem with a database of a cloud streaming management server.

BRIEF DESCRIPTION OF DRAWINGS

FIG. 7 is a diagram of a code showing an example of an initial condition of an automatic testing script according to an embodiment of the present invention.

MODES FOR CARRYING OUT THE INVENTION

Figure 1:
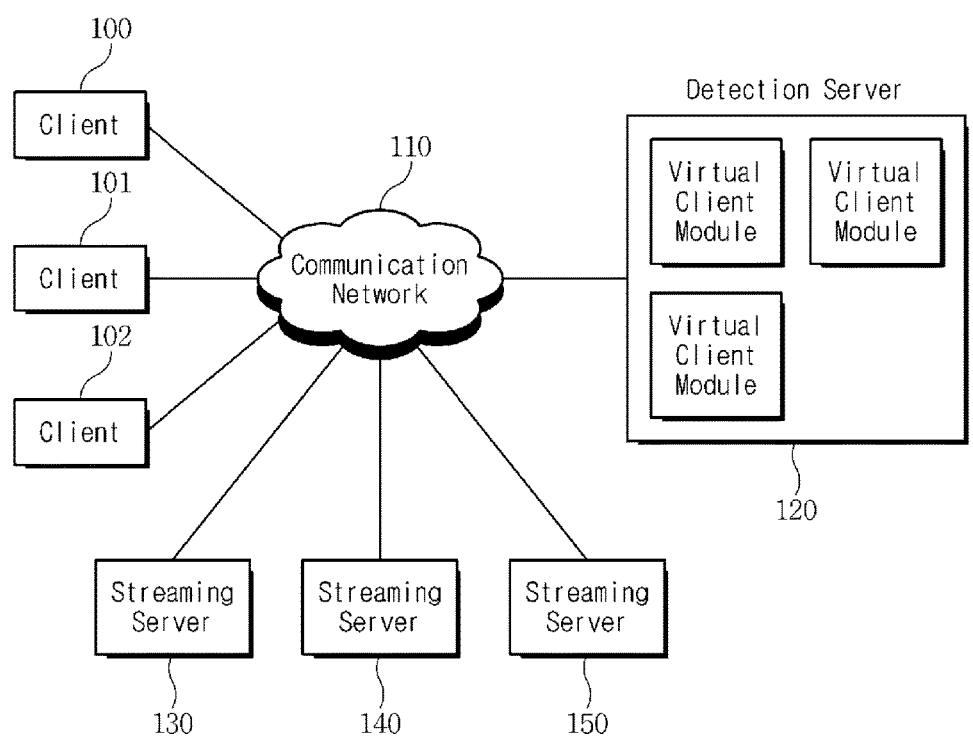
FIG. 1 is a block diagram showing an application error detection system for a cloud streaming service according to an embodiment of the present invention.

Hereinafter, exemplary embodiments of the present invention will be described in detail with reference to the accompanying drawings. However, detailed descriptions related to well-known functions or configurations will be omitted in order not to unnecessarily obscure the subject matter of the present invention. In addition, it should be noted that like reference numerals denote like elements throughout the specification and drawings.

The terms or words used in the specification and claims are not to be construed as being limited to typical or dictionary meanings, but construed as the meaning and concept corresponding to the technical idea of the present invention on the basis of the principle that an inventor can appropriately define the concept of the term for describing his or her invention in the best method. Accordingly, the configurations illustrated in embodiments and drawings described in the specification do not represent the technical idea of the present invention but are just exemplary embodiments. Thus, it should be understood that various equivalents and modifications may exist which can replace the exemplary embodiments when this specification is filed. While the terms "first," "second," etc. may be used herein to describe various elements, these terms are used only to differentiate one element from another, and not to limit the elements.

A mobile communication terminal that is connected to a communication network and configured to upload or download content on the basis of a cloud computing system will be described below as an example of a terminal device according to an embodiment of the present invention. However, the terminal device is not limited to the mobile communication terminal, and thus may be applied to various terminals such as an information communication device, a multimedia terminal, a wired terminal, a stationary terminal, and an Internet Protocol (IP) terminal. In addition, the terminal may be utilized advantageously when the terminal is one of mobile terminals having various mobile communication specifications such as a mobile phone, a portable multimedia player (PMP), a mobile Internet device (MID), a smartphone, a desktop, a tablet personal computer (PC), a laptop, a net book, and an information communication device.

An application error detection system for a cloud streaming service according to an embodiment of the present invention will be described below.

FIG. 1 is a block diagram showing an application error detection system for a cloud streaming service according to an embodiment of the present invention.

Referring to FIG. 1, the application error detection system for a cloud streaming service according to an embodiment of the present invention includes a cloud streaming system that includes a plurality of clients 100, 101, and 102 and a plurality of streaming servers 130, 140, and 150 that are connected through a communication network 110. The present invention includes a detection server 120 that is connected with the plurality of streaming servers 130, 140, and 150 over the communication network 110 and includes virtual client modules that perform some functions of the plurality of clients 100, 101, and 102, in order to test whether such a cloud streaming system operates normally.

In the following embodiment, three streaming servers 130, 140, and 150 and one detection server 120 including three virtual client modules will be described below as an example. However, the number of streaming server and the number of virtual client modules are not limited thereto, and may be implemented in various combinations depending on need or design.

The clients 100, 101, and 102 refer to terminals that may transmit and receive various kinds of data via the communication network 110, and in particular, refer to user-side terminal devices that connect to the streaming servers 130, 140, and 150 to provide a cloud streaming service.

For example, the clients 100, 101, and 102 may include a PC, a laptop, a mobile phone, a tablet PC, a navigation system, a smartphone, a personal digital assistant (PDA), a PMP, or a digital broadcast receiver such as a digital video broadcasting (DVB).

In addition, the clients 100, 101, and 102 refer to terminal devices that are each provided with a browser for communicating with the streaming servers 130, 140, and 150 via the communication network 110, a memory for storing programs and protocols, a microprocessor for executing various programs to perform arithmetic and control operations, etc.

That is, the clients 100, 101, and 102 may be any three terminals capable of communicating with the streaming servers 130, 140, and 150 and may include all types of communication computing devices such as a laptop, a mobile communication terminal, and a PDA in a broader sense.

For example, the clients 100, 101, and 102 may connect to the streaming servers 130, 140, and 150, request a specific service or function according to a user input, receive a result screen obtained by executing the requested service or function from the streaming servers 130, 140, and 150, and output the received result screen.

The streaming servers 130, 140, and 150 may be configured to provide a specific service or function to the plurality of clients 100, 101, and 102 through the communication network 110, and in particular, may provide a cloud streaming service.

For example, the streaming servers 130, 140, and 150 may provide a predetermined service or function regardless of an operating system (OS) type, central processing unit (CPU) performance, memory capacity, and other software and hardware specifications of the clients 100, 101, and 102.

For example, in order to provide a service or function that requires high-performance image processing, the streaming servers 130, 140, and 150 may perform the service or function according to a user input transmitted from the clients 100, 101, and 102 and then may transmit a result screen to the clients 100, 101, and 102. For this, the streaming servers 130, 140, and 150 may be provided with a screen virtualization function. In particular, according to the present invention, in order to test whether an application operates normally, the streaming servers 130, 140, and 150 may transmit application execution data to the virtual client modules of the detection server 120. Here, normal operation refers to an operation in which an application is normally running in the streaming servers 130, 140, and 150 without any failures.

In this case, various types of communication networks may be used as the communication network 110. The communication network may be implemented in one or any combination of a wired or wireless short-range communication network that provides communication with various kinds of information devices, a mobile communication network that provides communication between moving objects and between a moving object and an external object, a satellite communication network that provides communication between earth stations using a satellite, and a wired or wireless communication network. A standard transmission scheme of the above-described communication network is not limited to existing standard transmission methods and may include all standard transmission methods which will be developed in the future.

In addition, a communication network between the clients 100, 101, and 102 and the streaming servers 130, 140, and 150 in FIG. 1 may be the same as or different from a communication network between the streaming servers 130, 140, and 150 and the detection server 120.

In addition, a communication network between the client 100 and the streaming server 130, a communication network between the client 101 and the streaming server 140, and a communication network between the client 102 and the streaming server 150 may be the same as or different from one another.

The detection server 120 is a device for testing whether the streaming servers 130, 140, and 150 operate normally.

The detection server 120 includes at least one virtual client modules having some functions of the clients 100, 101, and 102.

In this case, the detection server 120 uses application execution data transmitted from at least one streaming server to test whether the streaming server has a failure.

In this case, the detection server 120 includes at least one virtual client module for outputting application execution data received from the different streaming servers 130, 140, and 150 to a screen. The detection server 120 captures the application execution data that is output from the at least one virtual client module, compares the captured test image with a reference image, and determines whether the streaming server has a failure according to whether the test image matches the reference image.

In more detail, the detection server 120 performs data processing, such as decoding, on application execution data received by the at least one virtual client module from a specific streaming server 130, outputs the result to the screen, compares an image captured at a predetermined time with a predetermined image, and determines that the streaming server 130 operates normally when the captured image matches the predetermined image. In this case, a capture time may be set on the basis of a time at which the application execution data is transmitted from the at least one streaming server and may be prestored in the detection server 120.

In this way, when the virtual client modules of the detection server 120 receive application execution data from the different streaming servers 130, 140, and 150, an application error detection apparatus for a cloud streaming service according to the present invention compares a test image that is output by each of the virtual client modules with a reference image and determines whether a corresponding server operates normally according to a result of the comparison. That is, the application error detection apparatus determines whether each of the streaming servers 130, 140, and 150 operates normally on the basis of a screen image provided to a user by each of the clients 100, 101, and 102. For this, the detection server 120 may request at least one or more streaming servers to simultaneously transmit application execution data, and each of the streaming servers 130, 140, and 150 may transmit the application execution data according to a signal for the request. Furthermore, a virtual client module which will receive and process the application execution data from the at least one streaming server may be predetermined. That is, the at least one streaming server may be mapped on a one-to-one basis or a many-to-one basis with at least one virtual client module. Thus, when the detection server 120 requests the at least one streaming server to transmit application execution data, the detection server 120 may also transmit information regarding a virtual client module that will transmit the application execution data. When the virtual client module is mapped with two or more streaming servers, the detection server 120 may control times at which the streaming servers are requested to transmit the application execution data in order to sequentially receive and process the application execution data from the two or more streaming servers.

A configuration of the detection server 120 in the system having the above-described configuration according to an embodiment of the present invention will be described in detail with reference to FIGS. 2 and 3.

An application error detection apparatus for a cloud streaming service according to an embodiment of the present invention will be described below.

Figure 2:
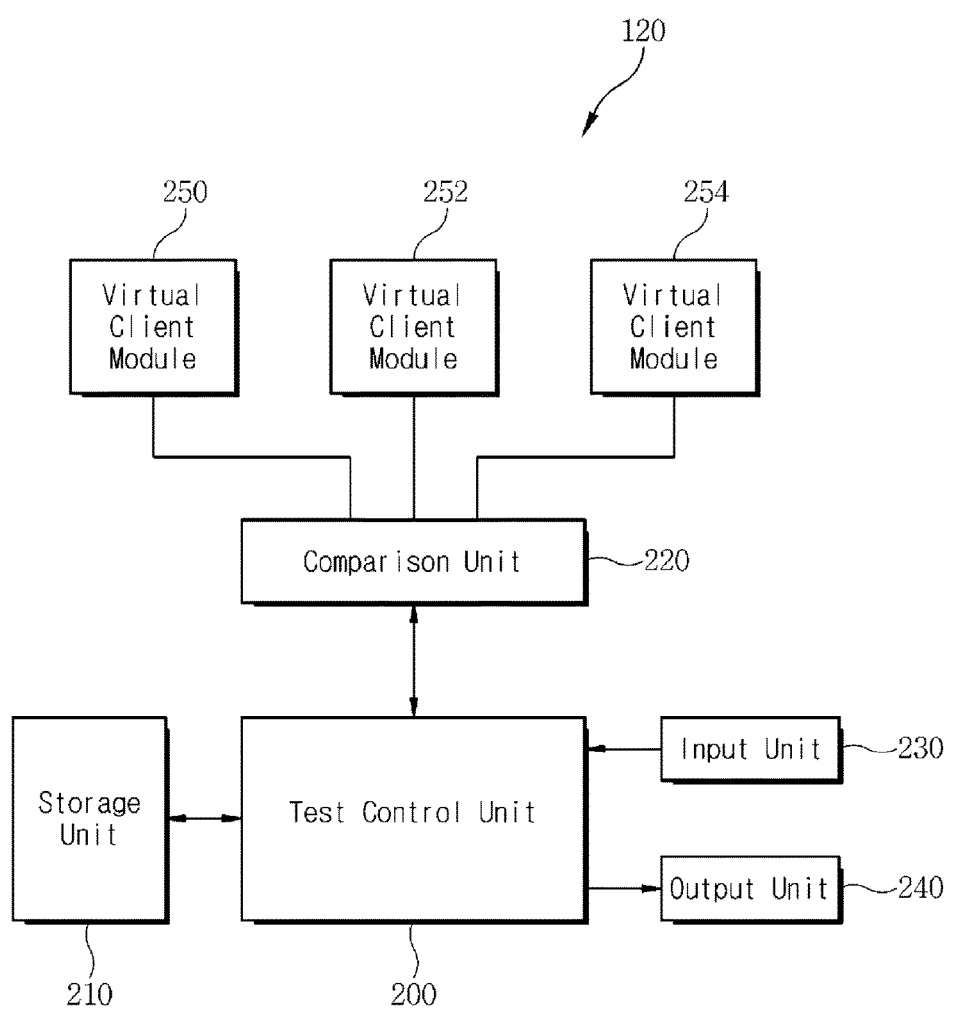
FIG. 2 is a block diagram showing an example of a detection server shown in FIG. 1.

FIG. 2 is a block diagram showing an example of the detection server 120 shown in FIG. 1.

Referring to FIG. 2, the detection server 120 shown in FIG. 1 includes a test control unit 200, a storage unit 210, a comparison unit 220, an input unit 230, an output unit 240, and at least one virtual client module 250, 252, and 254.

In this embodiment, the number of virtual client modules 250, 252, and 254 is three, but may be changed according to a system operation method.

The test control unit 200 performs all control operations needed to determine whether each of the streaming servers 130, 140, and 150 has a failure.

In addition, the test control unit 200 determines whether the streaming server has a failure according to a result of a comparison which is performed through the comparison unit 220 when a failure determination is needed, that is, according to whether a test image and a reference image match each other.

In this case, the test control unit 200 may determine that the streaming server does not have a failure when the test image and the reference image match each other, and may determine that the streaming server has a failure when the test image and the reference image do not match each other.

In this case, a time at which the failure determination is needed may be a time at which reception of data by the virtual client modules 250, 252, and 254 is detected and completed, a time at which the failure determination is demanded by a user through the input unit 230, or a time which is determined according to a predetermined period.

Like this, the need for the failure determination may be generated according to settings.

In addition, the reference image may be prestored. Alternatively, an image that is output from a specific virtual client module among the at least one or more virtual client modules 250, 252, and 254 may be set as the reference image by the comparison unit 220.

Alternatively, a first group of images that match each other among images output from the at least one or more virtual client modules 250, 252, and 254 may be set as the reference image by the comparison unit 220.

The storage unit 210 may store information needed to operate the detection server 120.

In this case, the storage unit 210 may store capture time information in order to simultaneously capture application execution data transmitted from at least one or more streaming servers 130, 140, and 150.

Also, the storage unit 210 may store default information regarding the application execution data transmitted from the streaming servers 130, 140, and 150, and in particular, may prestore a reference image for a specific time that is a reference to determine whether the streaming servers 130, 140, and 150 have a failure.

In this case, the storage unit 210 includes a magnetic medium such as a hard disk, a floppy disk, and a magnetic tape, an optical medium such as a compact disk read only memory (CD-ROM) and a digital video disk (DVD), a magneto-optical medium such as a floptical disk, a ROM, a random access memory (RAM), and a flash memory.

The comparison unit 220 captures the application execution data output from each of the virtual client modules 250, 252, and 254 under the control of the test control unit 200 and compares the captured test images with a reference image In this case, the comparison unit 220 may capture application execution data output from any one of the at least one or more virtual client modules and may set the captured image as the reference image.

In this case, the comparison unit 220 may capture a key frame of the application execution data and may set the captured key frame as the reference image.

In this case, the comparison unit 220 may capture a matching screen from the application execution data output from the at least one or more virtual client modules and may set the captured screen as the reference image.

In this case, the comparison unit 220 may capture a matching key frame from key frames of the application execution data output from the at least one or more virtual client modules and may set the captured key frame as the reference image.

The input unit 230 may generate a user input signal corresponding to a request or information of a server manager according to manipulation of the server manager, and may be implemented as one of various input means that are commercially available or will be available in the future For example, the input unit 230 may include a gesture input means for sensing a user's motion to generate a specific input signal in addition to a typical input device such as a keyboard, a mouse, a joystick, a touch screen, and a touch pad.

The output unit 240 may be implemented as a means for providing an operational result or status of the detection server 120 such that the operational result or status may be recognized by the user.

For example, the output unit 240 may include a display means for displaying a visual output through a screen, a speaker for outputting audible sounds, etc.

In particular, in the application error detection apparatus for a cloud streaming service according to the present invention, the output unit 240 may visually output a test image that is processed and output by the at least one or more virtual client modules 250, 252, and 254. The output unit 240 may compare the test image with a reference image and output a result of the comparison, or may display a result of whether the streaming server has a failure.

The virtual client modules 250, 252, and 254 may be configured to virtualize the clients 100, 101, and 102 that connect to the streaming servers 130, 140, and 150 and receive the cloud streaming service, and may perform some of the functions of the clients 100, 101, and 102.

For example, the virtual client modules 250, 252, and 254 may connect to specific streaming servers 130, 140, and 150 and receive application execution data from the specific streaming servers 130, 140, and 150.

The virtual client modules 250, 252, and 254 may be terminals that may receive data provided from the streaming servers 130, 140, and 150.

For example, the virtual client modules 250, 252, and 254 may be implemented by virtualizing any one of mobile terminals with various mobile communication specifications such as a cell phone, a PMP, an MID, a smartphone, a desktop, a tablet PC, a laptop, a net book, a PDA, a smart TV, and an information communication device.

Accordingly, the virtual client modules 250, 252, and 254 may be configured differently depending on the type of the terminal device.

In particular, in the application error detection apparatus for a cloud streaming service according to the present invention, the virtual client modules 250, 252, and 254 may be implemented to receive application execution data and also perform a screen image decoding function and a screen output function.

That is, the virtual client modules 250, 252, and 254 may process the received application execution data in the same manner as the clients 100, 101, and 102, and may output the processed application execution data to the screen through the output unit 240.

For example, the virtual client modules 250, 252, and 254 may decode the received application execution data like the clients 100, 101, and 102 and may output the decoded application execution data to the screen through the output unit 240.

In this case, the virtual client modules 250, 252, and 254 may capture a result that is output to the screen at a specific time and may transfer the captured result to the comparison unit 220 according to a demand for the capture from the comparison unit 220.

In this case, a capture time may be received from the comparison unit 220 or may be predetermined and stored.

In this case, the virtual client modules 250, 252, and 254 may output application execution data including only a key frame.

In this case, a captured test image may be formed by capturing image data stored in frame buffers of the virtual client modules 250, 252, and 254.

Figure 3:
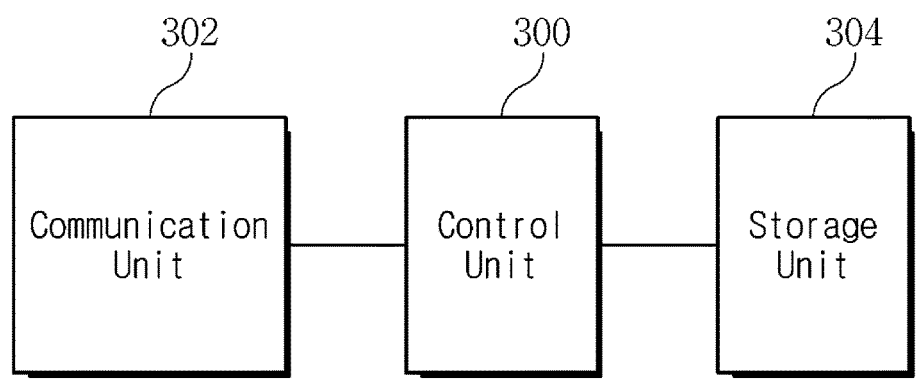
FIG. 3 is a block diagram showing an example of a virtual client module according to the present invention.

An internal configuration of the virtual client modules 250, 252, and 254 may be as shown in FIG. 3.

The virtual client modules 250, 252, and 254 have the same internal configuration. Thus, in FIG. 3, an internal configuration of any one of the virtual client modules 250 will be described as an example.

FIG. 3 is a block diagram showing an example of the virtual client module 250 according to the present invention.

Referring to FIG. 3, the virtual client module 250 includes a control unit 300, a communication unit 302, and a storage unit 304.

The control unit 300 performs overall control of the virtual client module 250, extracts a test image that is output to a screen at a specific time from each of the streaming servers 130, 140, and 150 according to a request of the comparison unit 220, and transfers the extracted test image to the comparison unit 220.

In addition, the control unit 300 may transmit a transmission request signal for application execution data to the streaming servers 130, 140, and 150 through the communication unit 302.

In this case, upon transmitting the transmission request signal for the application execution data, the control unit 300 may also transmit identification information of the virtual client module that transmits the application execution data, and may sequentially transmit the transmission request signal for the application execution data to each of a plurality of streaming servers according to a schedule of the streaming servers.

The communication unit 302 receives application execution data transmitted from the streaming servers 130, 140, and 150 through the communication network 110.

In this case, the communication unit 302 may transmit and receive data through various communication schemes including a wired scheme and a wireless scheme.

In this case, the communication unit 302 may include a plurality of communication modules that transmit data according to different communication schemes.

The storage unit 304 stores information needed to operate the virtual client module 250.

In particular, the storage unit 304 may store the application execution data received from the streaming servers 130, 140, and 150.

In addition, the storage unit 304 may store the test image that is obtained by performing a predetermined data processing on the received application execution data and is finally output to the screen.

In addition, the storage unit 304 may prestore capture time information of the test image according to its settings.

In this case, the storage unit 304 includes a magnetic medium such as a hard disk, a floppy disk, and a magnetic tape, an optical medium such as a CD-ROM and a DVD, a magneto-optical medium such as a floptical disk, a ROM, a RAM, and a flash memory.

A process of testing whether a server operates normally in the application error detection system for a cloud streaming service having the above-described configuration will be described in detail with reference to FIGS. 4 and 5.

Figure 4:
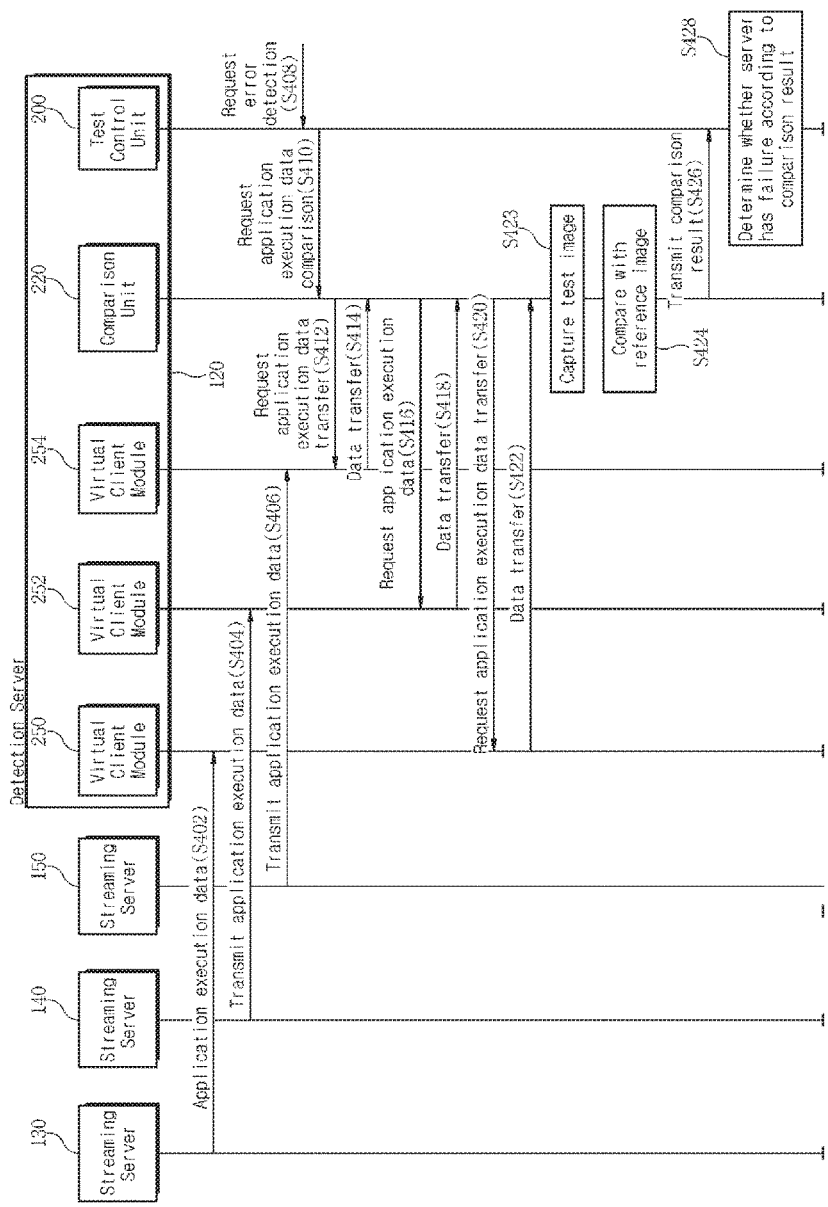
FIG. 4 is an operational flowchart generally showing an application error detection method for a cloud streaming service according to an embodiment of the present invention.

FIG. 4 is an operational flowchart generally showing an application error detection method for a cloud streaming service according to an embodiment of the present invention.

In the application error detection method for a cloud streaming service according to an embodiment of the present invention, the streaming servers 130, 140, and 150 simultaneously transmit application execution data to the virtual client modules 250, 252, and 254 of the detection server 120 (S402 to S406).

That is, at the same time, the streaming server 130 transmits application execution data to the virtual client module 250, the streaming server 140 transmits application execution data to the virtual client module 252, and the streaming server 150 transmits application execution data to the virtual client module 254.

In addition, in the application error detection method for a cloud streaming service according to an embodiment of the present invention, when the application execution data is received, the test control unit 200 of the detection server 120 requests the comparison unit 220 to compare the application execution data according to an error detection request (S408 and S410).

In addition, in the application error detection method for a cloud streaming service according to an embodiment of the present invention, the comparison unit 220 requires the virtual client modules 250, 252, and 254 to transfer application screens received from the streaming servers 130, 140, and 150 (S412, S416, and S420).

In addition, in the application error detection method for a cloud streaming service according to an embodiment of the present invention, the virtual client modules 250, 252, and 254 transfer the application execution data to the comparison unit 220 according to the demand from the comparison unit 220.

In addition, in the application error detection method for a cloud streaming service according to an embodiment of the present invention, the comparison unit 220 captures the application execution data at a specific time to acquire a test image (S423).

In addition, in the application error detection method for a cloud streaming service according to an embodiment of the present invention, the comparison unit 220 compares the test image with a predetermined reference image (S424).

In addition, in the application error detection method for a cloud streaming service according to an embodiment of the present invention, a process of setting the reference image may be further performed before step S424.

In addition, in the application error detection method for a cloud streaming service according to an embodiment of the present invention, the comparison unit 220 transfers a result of the comparison to the test control unit 200 (S426).

In addition, in the application error detection method for a cloud streaming service according to an embodiment of the present invention, the test control unit 200 determines whether a server has a failure according to the result of the comparison (S428).

In this case, in step S428, the test control unit 200 determines that the streaming server has a failure when the test image does not match the reference image, and determines that the streaming server does not have a failure when the test image matches the reference image.

The application error detection method for a cloud streaming service according to an embodiment of the present invention in terms of the detection server 120 will be described below.

Figure 5:
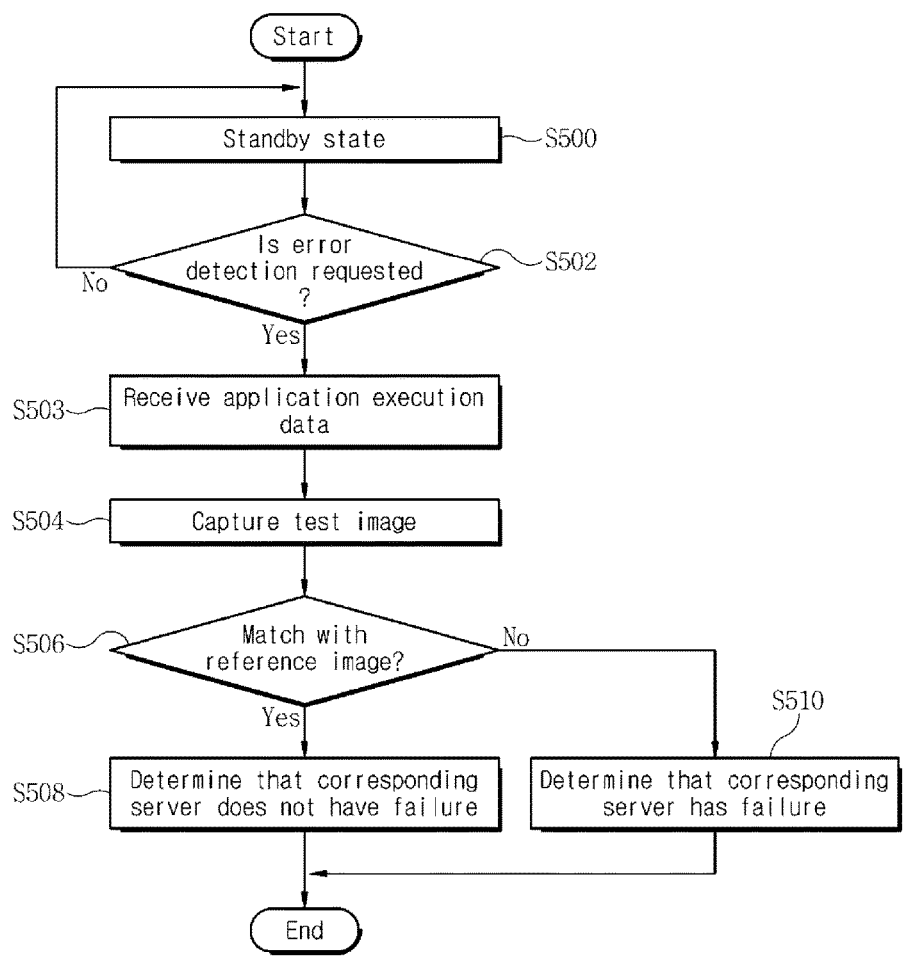
FIG. 5 is an operational flowchart showing an application error detection method for a cloud streaming service in terms of a detection server according to an embodiment of the present invention.

FIG. 5 is an operational flowchart showing the application error detection method for a cloud streaming service according to an embodiment of the present invention in terms of the detection server 120.

In the application error detection method for a cloud streaming service according to an embodiment of the present invention, at an error detection time, the detection server 120 receives application execution data from the streaming servers 130, 140, and 150 through all virtual client modules included in the detection server 120, outputs the received application execution data to a screen, and captures the output application execution data (S500 to S504).

In addition, in the application error detection method for a cloud streaming service according to an embodiment of the present invention, the detection server 120 compares a test image captured in step S504 with a reference image, determines that a server has a failure when the test image does not match the reference image, and determines that the server does not have a failure when the test image matches the reference image (S506 to S510).

The application error detection method for a cloud streaming service according to the present invention may be implemented as a program or a smartphone app that may be performed through various computer means. In this case, the program or the smartphone app may be recorded in a computer-readable medium. The computer-readable medium may also include a program instruction, a data file, a data structure, or a combination thereof. The program instruction recorded in the medium may be designed and configured specifically for the present invention or can be publicly known and available to those skilled in the field of computer software. Examples of the computer-readable medium include a magnetic medium such as a hard disk, a floppy disk, and a magnetic tape, an optical medium such as a CD-ROM and a DVD, a magneto-optical medium such as a floptical disk, and a hardware device such as a ROM, a RAM, a flash memory, etc. that is specifically configured to store and perform the program instruction. Examples of the program instruction may include a high-level language code executable by a computer with an interpreter, in addition to a machine language code made by a compiler. The above exemplary hardware device can be configured to operate as one or more software modules in order to perform the operation of the present invention, and vice versa.

As described above, the application error detection method for a cloud steaming service, and the apparatus and system therefor according to the present invention are not limited to the configurations and methods of the above-described embodiments, and various modifications to the embodiments may be made by selectively combining all or some of the embodiments.

A cloud streaming server test system according to an embodiment of the present invention will be described below.

Figure 6:
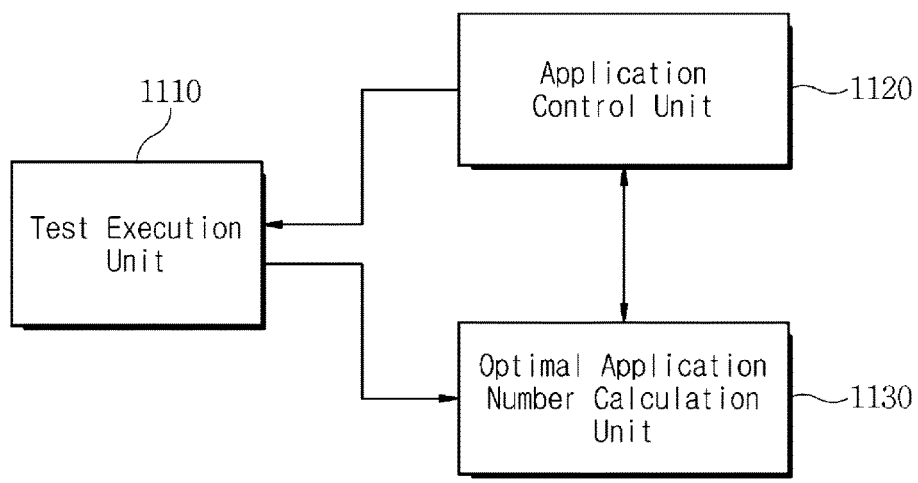
FIG. 6 is a block diagram showing an example of a cloud streaming server test apparatus according to an embodiment of the present invention.

FIG. 6 is a block diagram showing an example of a cloud streaming server test apparatus according to an embodiment of the present invention.

Referring to FIG. 6, the cloud streaming server test apparatus according to an embodiment of the present invention includes a test execution unit 1110, an application control unit 1120, and an optimal application number calculation unit 1130.

The test execution unit 1110 repeatedly performs a test by automatically and repeatedly executing an automatic testing script corresponding to a test application to be tested according to a predetermined initial condition to execute one or more test application.

In this case, in order to automate the test, the automatic testing script may be a script that generates a key input corresponding to the test application, repeats the test, and executes the test application the same number of times as the number of applications being executed.

In this case, the automatic testing script may be generated automatically or by a user.

According to an embodiment, the initial condition may include one or more of the maximum CPU utilization, the maximum graphics processing unit (GPU) utilization, a check interval of CPU utilization and GPU utilization, the initial number of test applications, the final number of test applications, and a test time.

In this case, the maximum CPU utilization may be an upper limit of the CPU utilization at which the cloud streaming server can reliably execute the test application. Likewise, the maximum GPU utilization may be an upper limit of the GPU utilization at which the cloud streaming server can reliably execute the test application.

In this case, the check interval may be an interval for checking the CPU utilization and the GPU utilization when monitoring system resource utilization during a test time.

In this case, when the test is started, the initial number of test applications may be the number of test applications to be executed in a first test.

In this case, the final number of test applications may be the number that is used to determine whether a test end condition is satisfied and may be a number for limiting a range of the number of applications to be executed during the test. In addition, according to a result of a comparison between the initial number of test applications and the final number of test applications, the test execution unit 1110 may enter any one of an application increasing test mode and an application decreasing test mode.

In this case, the application increasing test mode may be a test mode in which the first test is started by executing a small number of applications, and the optimal number of executable applications is calculated while the number of applications being executed is increased.

Conversely, the application decreasing test mode may be a test mode in which the first test is started by executing a large number of applications, and the optimal number of executable applications is calculated while the number of applications being executed is decreased.

In this case, the test time may be a time taken to perform the test once. After the test time has elapsed, the test execution unit 1110 determines whether the test end condition is satisfied and then repeats or ends the test.

According to an embodiment, the test execution unit 1110 may find a maximum load point at which the system resource utilization is recorded as a maximum value during the test time and may reset the test time to a time at which the maximum load point is reached.

For example, when the system resource utilization is recorded as the maximum value at a point 05:30 during the test time of 7 minutes, the point 05:30 is the maximum load point. Then, since the test time is reset to the point 05:30, subsequent tests may be performed only for 5 minutes 30 seconds, thereby saving 1 minute 30 seconds.

According to an embodiment, the system resource utilization may be determined in consideration of one or both of the CPU utilization and the GPU utilization.

For example, the system resource utilization may be determined as an average of the CPU utilization and the GPU utilization or may be considered as whichever is higher between the CPU utilization and the GPU utilization at each time. Alternatively, a later point between a point at which the CPU utilization is recorded as a maximum value and a point at which the GPU utilization is recorded as a maximum value may be considered as the maximum load point.

According to an embodiment, when the initial number of test applications is smaller than the final number of test applications, the test execution unit 1110 may enter the application increasing test mode. Alternatively, when the initial number of test applications is larger than the final number of test applications, the test execution unit 1110 may enter the application decreasing test mode.

For example, when the initial number of test applications is 1 and the final number of test application is 5, the test execution unit 1110 may enter the application increasing test mode. Conversely, when the initial number of test applications is 5 and the final number of test application is 1, the test execution unit 1110 may enter the application decreasing test mode.

The application control unit 1120 increases or decreases the number of applications being executed which is the number of test applications being executed during the test each time the test is repeated.

In this case, the increase or decrease in the number of applications being executed is changed depending on the test mode of the test execution unit 1110. That is, the test is performed while the number of applications being executed is increased in the application increasing test mode, and the test is performed while the number of applications being executed is decreased in the application decreasing test mode.

When it is determined that the test end condition is satisfied, the optimal application number calculation unit 1130 ends the test and calculates the optimal number of executable applications.

In this case, the optimal number of executable applications may be a number indicating an upper limit at which a plurality of test applications may be reliably executed when the cloud streaming server executes the plurality of test applications.

In this case, the test end condition and the method of calculating the optimal number of executable applications are changed depending on the test mode of the test execution unit 1110.

The application increasing test mode will be described below.

According to an embodiment, the application increasing test mode may repeat the test while increasing the number of applications being executed each time when it is determined that the test end condition is not satisfied.

That is, the optimal number of executable applications may be found by monitoring system resource utilization during the test time while executing one more application each time the test is performed.

In this case, the test end condition may be satisfied when the CPU utilization and the GPU utilization are greater than the maximum CPU utilization and the maximum GPU utilization during the test time, respectively. Alternatively, the test end condition may be satisfied when the number of applications being executed is equal to the final number of test applications.

That is, the test end condition may be satisfied when the CPU utilization exceeds the maximum CPU utilization or the GPU utilization exceeds the maximum GPU utilization.

In this case, it may be determined that the test end condition is satisfied even when the excess is temporary irrespective of excess time, and it may also be determined that the test end condition is satisfied when the excess time is longer than a predetermined time.

In this case, the optimal number of executable applications may be one less than the number of applications being executed when the test end condition is satisfied.

That is, the number of applications being executed in the last test in which the CPU utilization and the GPU utilization do not exceed the maximum CPU utilization and the maximum GPU utilization, respectively, is equal to the optimal number of executable applications.

For example, on a condition that the number of applications being executed is four, that is, four test applications are being executed, when the test end condition is satisfied, the optimal number of executable applications may be three.

The application decreasing test mode will be described below.

According to an embodiment, the application decreasing test mode may repeat the test while decreasing the number of applications being executed when it is determined that the test end condition is not satisfied.

That is, the optimal number of executable applications may be found by monitoring system resource utilization during the test time while executing one fewer application each time the test is performed.

In this case, the test end condition may be satisfied when the CPU utilization and the GPU utilization are equal to or less than the maximum CPU utilization and the maximum GPU utilization, respectively. Alternatively, the test end condition may be satisfied when the number of applications being executed is equal to the final number of test applications.

That is, the test end condition may be satisfied when the CPU utilization does not exceed the maximum CPU utilization and the GPU utilization does not exceed the maximum GPU utilization.

In this case, it may be determined that the test end condition is not satisfied even when the excess is temporary irrespective of excess time, and it may also be determined that the test end condition is not satisfied when the excess time is longer than a predetermined time.

In this case, the optimal number of executable applications may be the number of applications being executed when the test end condition is satisfied.

That is, the number of applications being executed in the first test in which the CPU utilization and the GPU utilization do not exceed the maximum CPU utilization and the maximum GPU utilization, respectively, may be equal to the optimal number of executable applications.

For example, on a condition that the number of applications being executed is four, that is, while four test applications are being executed, when the test end condition is satisfied, the optimal number of executable applications may be four.

FIG. 7 is a diagram of a code showing an example of an initial condition of an automatic testing script according to an embodiment of the present invention.

Referring to FIG. 7, the initial condition of the automatic testing script according to an embodiment of the present invention includes a maximum CPU utilization 1210, a maximum GPU utilization 1220, a check interval 1230, an initial number of test applications 1240, the final number of test applications 1250, and a test time 1260.

The maximum CPU utilization 1210 and the maximum GPU utilization 1220 are 70. That is, when it is determined whether the test end condition is satisfied, the CPU utilization and the GPU utilization are compared with 70 percent.

In this case, the maximum CPU utilization 1210 may be the upper limit of the CPU utilization at which the cloud streaming server can reliably execute the test application. Likewise, the maximum GPU utilization 1220 may be the upper limit of the GPU utilization at which the cloud streaming server can reliably execute the test application.

In this case, the maximum CPU utilization 1210 and the maximum GPU utilization 1220 are represented as percentages.

In this case, it should be noted that the maximum CPU utilization 1210 and the maximum GPU utilization 1220 may be different from or the same as each other.

The check interval 1230 is three seconds.

In this case, the check interval 1230 may be an interval for checking the CPU utilization and the GPU utilization when monitoring system resource utilization during a test time.

That is, when the test is performed, the CPU utilization and the GPU utilization may be checked every three seconds.

The initial number of test applications 1240 is one, and the final number of test applications 1250 is five.

In this case, when the test is started, the initial number of test applications 1240 may be the number of test applications to be executed in the first test.

In this case, the final number of test applications 1250 may be the number that is used to determine whether the test end condition is satisfied and may be the number for limiting the range of the number of applications to be executed during the test.

In addition, according to a result of a comparison between the initial number of test applications 1240 and the final number of test applications 1250, the test execution unit 1110 may enter any one of the application increasing test mode and the application decreasing test mode.

That is, since the initial number of test applications 1240 is smaller than the final number of test applications 1250, the test execution unit 1110 may enter the application increasing test mode.

The test time 1260 is seven minutes.

In this case, the test time 1260 is the time taken to perform the test once. After the test time has elapsed, the test execution unit 1110 determines whether the test end condition is satisfied and then repeats or ends the test.

That is, each time the test is repeated, the test is performed for seven minutes. In this case, beginning with a second test, the test time may be reset on the basis of the maximum load point, and thus the test time may be shortened.

Graphs showing results of the test according to an embodiment of the present invention will be described below as an example with reference to FIGS. 8 to 10. In this case, the system resource utilization, the CPU utilization, and the GPU utilization are discretely checked according to the check interval. However, the graph formed by connecting the checked points will be described as an example.

Figure 8:
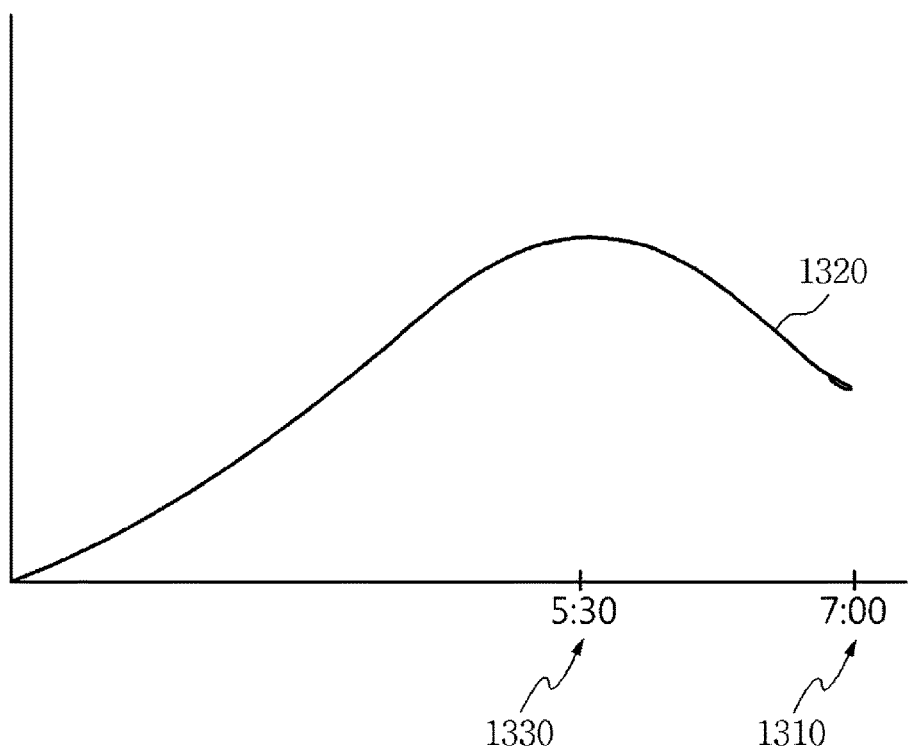
FIG. 8 is a graph showing an example of a test result according to an embodiment of the present invention.

FIG. 8 is a graph showing an example of a test result according to an embodiment of the present invention.

An example of finding a maximum load point and resetting a test time will be described below with reference to FIG. 8.

Referring to FIG. 8, the test result according to an embodiment of the present invention includes a test time 1310, system resource utilization 1320, and a maximum load point 1330.

The test time 1310 is seven minutes. The test is performed once for seven minutes.

According to an embodiment, the system resource utilization 1320 may be determined in consideration of one or both of the CPU utilization and the GPU utilization.

For example, the system resource utilization may be determined as the average of the CPU utilization and the GPU utilization or may be considered as whichever is higher between the CPU utilization and the GPU utilization at each time.

The maximum load point 1330 is a time at which the system resource utilization 1320 is recorded as a maximum value.

That is, the point 05:30 is the maximum load point 1330.

In this case, the test execution unit may find the maximum load point 1330 at which the system resource utilization 1320 is recorded as the maximum value during the test time 1310 and may reset the test time 1310 to a time at which the maximum load point 1330 is reached.

Then, since the test time is reset to 05:30, subsequent tests may be performed only for 5 minutes 30 seconds, thereby saving 1 minute 30 seconds.

An example of the application increasing test mode will be described below with reference to FIGS. 9 and 10.

Figure 9:
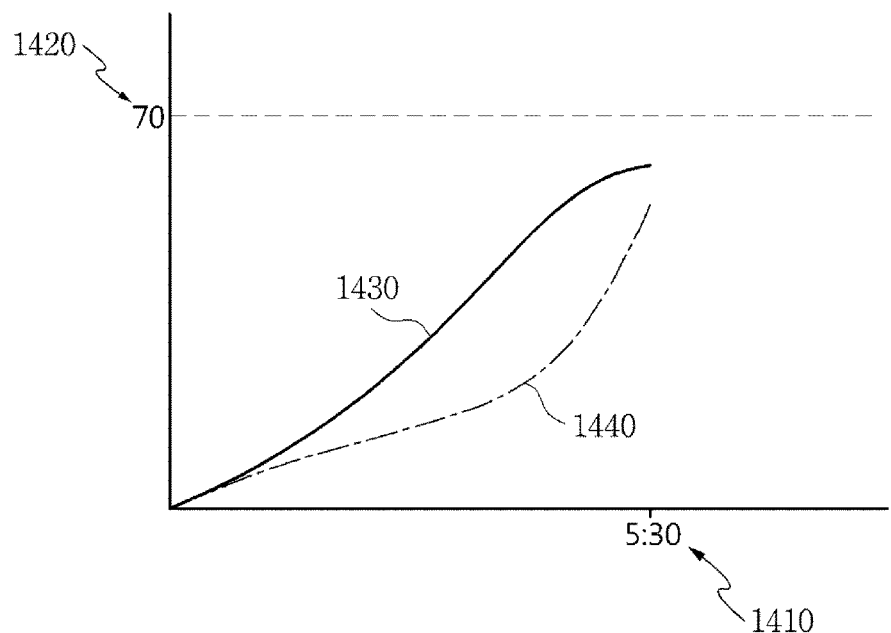
FIG. 9 is a graph showing another example of a test result according to an embodiment of the present invention.

FIG. 9 is a graph showing another example of a test result according to an embodiment of the present invention.

Referring to FIG. 9, the test result according to an embodiment of the present invention includes a test time 1410, a maximum CPU utilization and a maximum GPU utilization 1420, CPU utilization 1430, and GPU utilization 1440.

In this case, since the maximum CPU utilization and the maximum GPU utilization are the same and equal 70 percent, the maximum CPU utilization and the maximum GPU utilization are shown as one line on the graph. However, it should be noted that the maximum CPU utilization and the maximum GPU utilization may be separately shown when the maximum CPU utilization and the maximum GPU utilization are different from each other.

By executing a test application during the test time 1410, that is, for 5 minutes 30 seconds, and monitoring system resources, the CPU utilization 1430 and the GPU utilization 1440 may be obtained.

In this case, since the CPU utilization 1430 and the GPU utilization 1440 do not exceed the maximum CPU utilization and the maximum GPU utilization 1420 during the test time 1410, it is determined that the test end condition is not satisfied.

Accordingly, the test is repeated while the number of applications being executed is increased.

Figure 10:
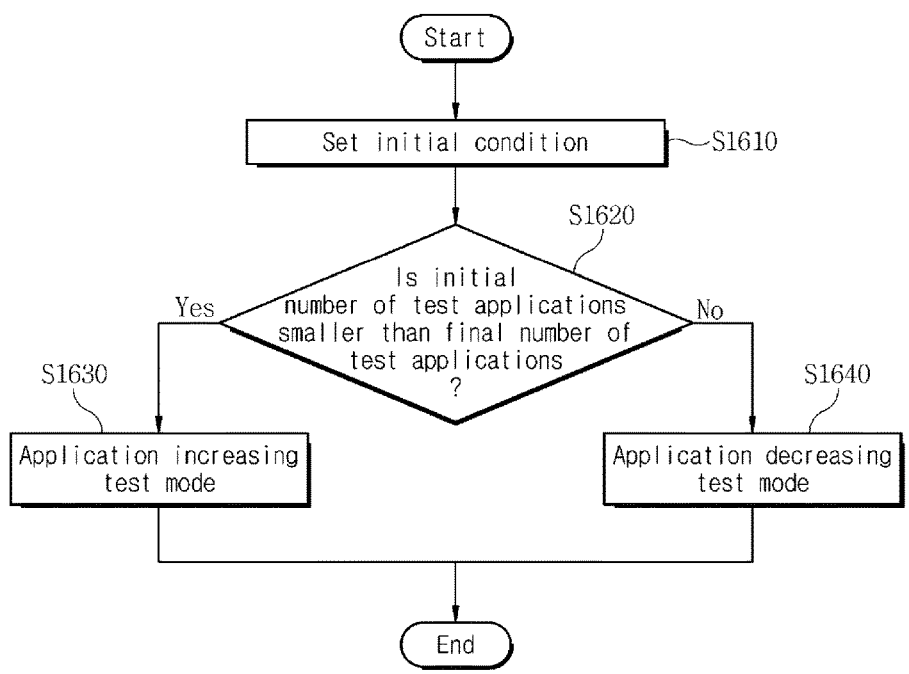
FIG. 10 is a graph showing another example of a test result according to an embodiment of the present invention.

FIG. 10 is a graph showing another example of a test result according to an embodiment of the present invention.

Referring to FIG. 10, the test result according to an embodiment of the present invention includes a test time 1510, a maximum CPU utilization and a maximum GPU utilization 1520, CPU utilization 1530, and GPU utilization 1540.

In this case, since the maximum CPU utilization and the maximum GPU utilization are the same and equal 70 percent, the maximum CPU utilization and the maximum GPU utilization are shown as one line on the graph. However, it should be noted that the maximum CPU utilization and the maximum GPU utilization may be separately shown when the maximum CPU utilization and the maximum GPU utilization are different from each other.

By executing the test application during the test time 1510, that is, for 5 minutes 30 seconds, and monitoring system resources, the CPU utilization 1530 and the GPU utilization 1540 may be obtained.

In this case, since the CPU utilization 1530 exceeds 70 percent, which is the maximum CPU utilization, during the test time 1510, it is determined that the test end condition is satisfied.

Accordingly, the test is ended, and the optimal number of executable applications is calculated.

In this case, the optimal number of executable applications may be one less than the number of applications being executed when the test end condition is satisfied. That is, the number of applications being executed in the last test in which the CPU utilization and the GPU utilization do not exceed the maximum CPU utilization and the maximum GPU utilization, respectively, is equal to the optimal number of executable applications.

For example, when the number of applications being executed is four, the optimal number of executable applications is three, which is one less than the number of applications being executed.

Although not shown in FIGS. 9 and 10, the test may be alternatively performed in the application decreasing test mode.

In this case, by executing the test application during the test time and monitoring system resources, the CPU utilization and the GPU utilization may be obtained.

In this case, when the CPU utilization and the GPU utilization are greater than the maximum CPU utilization and the maximum GPU utilization, respectively, it may be determined that the test end condition is not satisfied. The test may be repeated while decreasing the number of applications being executed.

In this case, when it is determined that the test end condition is satisfied, the test may be ended, and then the optimal number of executable applications may be calculated.

In this case, the optimal number of executable applications may be the number of applications being executed when the test end condition is satisfied. That is, the number of applications being executed in the first test in which the CPU utilization and the GPU utilization do not exceed the maximum CPU utilization and the maximum GPU utilization, respectively, may be equal to the optimal number of executable applications.

For example, on a condition that the number of applications being executed is four, when the test end condition is satisfied, the optimal number of executable applications may be four.

Figure 11:
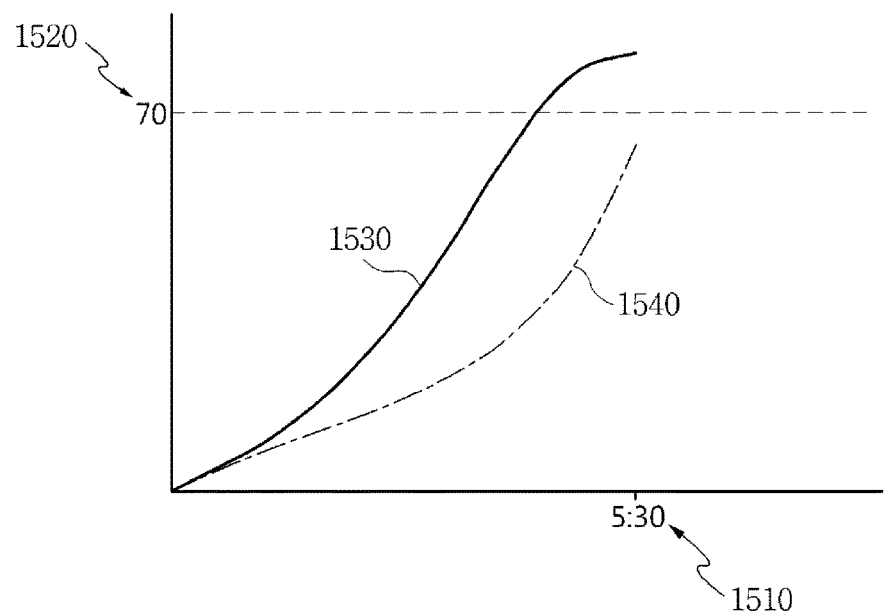
FIG. 11 is an operational flowchart showing an example of a cloud streaming server test method according to an embodiment of the present invention.

FIG. 11 is an operational flowchart showing an example of a cloud streaming server test method according to an embodiment of the present invention.

Referring to FIG. 11, the cloud streaming server test method according to an embodiment of the present invention includes setting an initial condition for executing an automatic testing script corresponding to a test application to be tested (S1610).

In this case, in order to automate the test, the automatic testing script may be a script that generates a key input corresponding to the test application, repeats the test, and executes the test application the same number of times as the number of application being executed.

In this case, the automatic testing script may be generated automatically or by a user.

According to an embodiment, the initial condition may include one or more of a maximum CPU utilization, a maximum GPU utilization, a check interval of CPU utilization and GPU utilization, the initial number of test applications, the final number of test applications, and a test time.

In this case, the maximum CPU utilization may be an upper limit of the CPU utilization at which the cloud streaming server can reliably execute the test application. Likewise, the maximum GPU utilization may be an upper limit of the GPU utilization at which the cloud streaming server can reliably execute the test application.

In this case, the check interval may be an interval for checking the CPU utilization and the GPU utilization when monitoring system resource utilization during the test time.

In this case, when the test is started, the initial number of test applications may be the number of test applications to be executed in a first test.

In this case, the final number of test applications may be a number that is used to determine whether a test end condition is satisfied and may be a number for limiting the range of the number of applications to be executed during the test. According to a result of a comparison between the initial number of test applications and the final number of test applications, any one of the application increasing test mode and the application decreasing test mode may be entered.

In this case, the test time may be a time taken to perform the test once. After the test time has elapsed, it is determined whether the test end condition is satisfied and the test is repeated or ended.

In addition, the cloud streaming server test method according to an embodiment of the present invention includes determining whether the initial number of test applications is smaller than the final number of test applications (S1620).

In addition, the cloud streaming server test method according to an embodiment of the present invention includes entering the application increasing test mode when the initial number of test applications is smaller than the final number of test applications (S1630).

For example, when the initial number of test applications is one, and the final number of test applications is five, the application increasing test mode may be entered.

In addition, the cloud streaming server test method according to an embodiment of the present invention includes entering the application decreasing test mode when the initial number of test applications is greater than the final number of test applications (S1640).

For example, when the initial number of test applications is five, and the final number of test applications is one, the application decreasing test mode may be entered.

Figure 12:
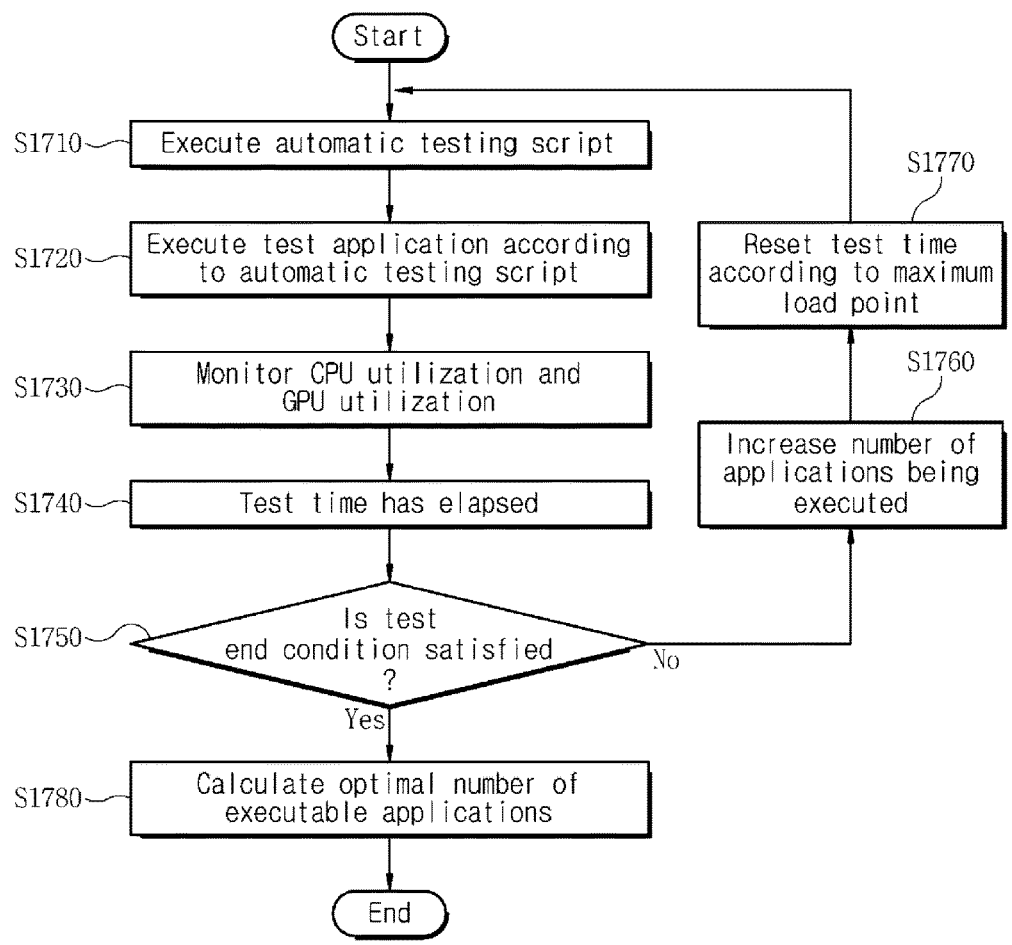
FIG. 12 is an operational flowchart showing an example of an application increasing test mode shown in FIG. 11.

FIG. 12 is an operational flowchart showing an example of an application increasing test mode shown in FIG. 11.

Referring to FIG. 12, the application increasing test mode shown in FIG. 11 automatically and repeatedly executes an automatic testing script (S1710).

In addition, the application increasing test mode shown in FIG. 11 repeatedly performs a test by executing one or more test applications according to the automatic testing script (S1720).

In addition, the application increasing test mode shown in FIG. 11 monitors CPU utilization and GPU utilization while performing the test (S1730).

In this case, the CPU utilization and the GPU utilization may be checked according to a certain check interval of an initial condition.

In addition, the application increasing test mode shown in FIG. 11 determines whether a test end condition is satisfied (S1750) when a test time has elapsed (S1740).

In this case, the test end condition may be satisfied when the CPU utilization and the GPU utilization are greater than the maximum CPU utilization and the maximum GPU utilization during the test time, respectively. Alternatively, the test end condition may be satisfied when the number of applications being executed is equal to the final number of test applications.

That is, the test end condition may be satisfied when the CPU utilization exceeds the maximum CPU utilization or the GPU utilization exceeds the maximum GPU utilization during the test time.

In this case, it may be determined that the test end condition is satisfied even when the excess is temporary irrespective of excess time, and it may also be determined that the test end condition is satisfied when the excess time is longer than a predetermined time.

In addition, the application increasing test mode shown in FIG. 11 may repeat the test while increasing the number of applications being executed when it is determined that the test end condition is not satisfied (S1760).

That is, the optimal number of executable applications may be found by monitoring system resource utilization during the test time while executing one more application each time the test is performed.

In addition, the application increasing test mode shown in FIG. 11 may find a maximum load point at which the system resource utilization is recorded as a maximum value during the test time and may reset the test time to a time at which the maximum load point is reached.

For example, when the system resource utilization is recorded as the maximum value at a point 05:30 during the test time of 7 minutes, the point 05:30 is the maximum load time. Then, since the test time is reset to the point 05:30, subsequent tests may be performed only for 5 minutes 30 seconds, thereby saving 1 minute 30 seconds.

According to an embodiment, the system resource utilization may be determined in consideration of one or both of the CPU utilization and the GPU utilization.

For example, the system resource utilization may be determined as the average of the CPU utilization and the GPU utilization or may be considered as whichever is higher between the CPU utilization and the GPU utilization at each time. Alternatively, a later point between a point at which the CPU utilization is recorded as a maximum value and a point at which the GPU utilization is recorded as a maximum value may be considered as the maximum load point.

When it is determined that the test end condition is satisfied, the application increasing test mode shown in FIG. 11 ends the test and calculates the optimal number of executable applications (S1780).

In this case, the optimal number of executable applications may be a number indicating an upper limit at which a plurality of test applications may be reliably executed when the cloud streaming server executes the plurality of test applications.

In this case, the optimal number of executable applications may be one less than the number of applications being executed when the test end condition is satisfied.

For example, on a condition that the number of applications being executed is four, that is, four test applications are being executed, when the test end condition is satisfied, the optimal number of executable applications may be three. That is, the number of applications being executed in the last test in which the CPU utilization and the GPU utilization do not exceed the maximum CPU utilization and the maximum GPU utilization, respectively, is equal to the optimal number of executable applications.

Figure 13:
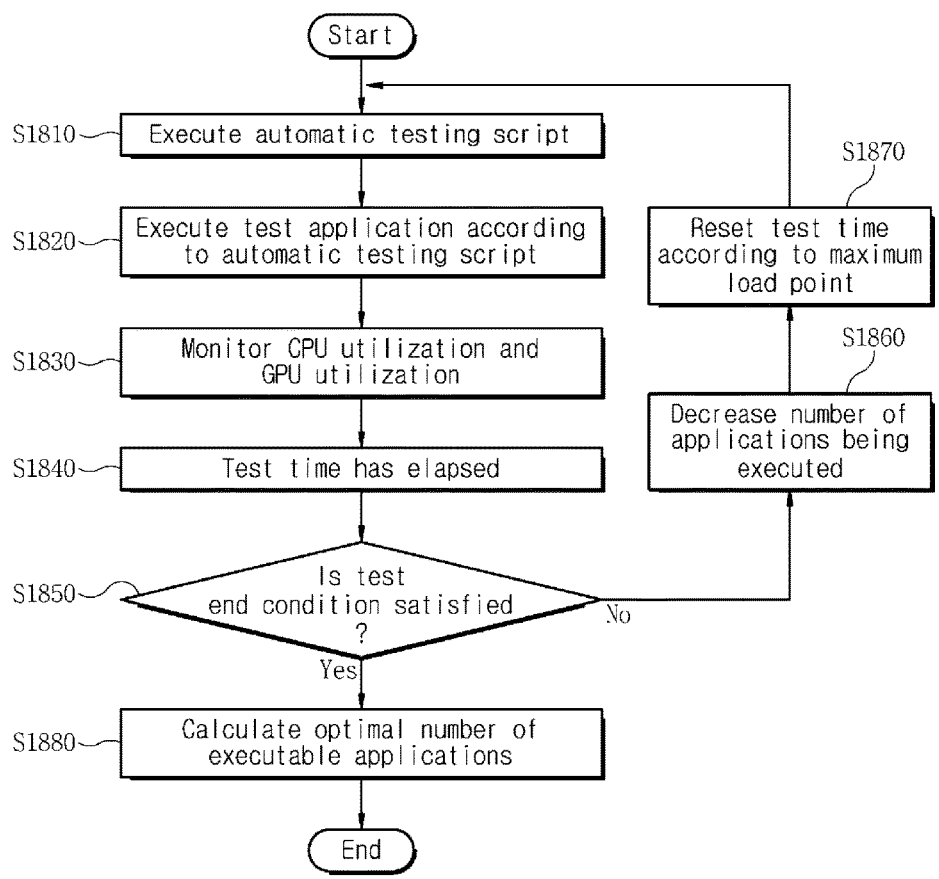
FIG. 13 is an operational flowchart showing an example of an application decreasing test mode shown in FIG. 11.

FIG. 13 is an operational flowchart showing an example of an application decreasing test mode shown in FIG. 11.

Referring to FIG. 13, the application decreasing test mode shown in FIG. 11 automatically and repeatedly executes an automatic testing script (S1810).

In addition, the application decreasing test mode shown in FIG. 11 repeatedly performs a test by executing one or more test applications according to the automatic testing script (S1820).

In addition, the application decreasing test mode shown in FIG. 11 monitors CPU utilization and GPU utilization while performing the test (S1830).

In this case, the CPU utilization and the GPU utilization may be checked according to a certain check interval of an initial condition.

In addition, the application decreasing test mode shown in FIG. 11 determines whether a test end condition is satisfied (S1850) when a test time has passed (S1840).

In this case, the test end condition may be satisfied when the CPU utilization and the GPU utilization are equal to or less than the maximum CPU utilization and the maximum GPU utilization during the test time, respectively. Alternatively, the test end condition may be satisfied when the number of applications being executed is equal to the final number of test applications.

That is, the test end condition may be satisfied when the CPU utilization does not exceed the maximum CPU utilization and the GPU utilization does not exceed the maximum GPU utilization during the test time.

In this case, it may be determined that the test end condition is not satisfied even when the excess is temporary irrespective of excess time, and it may also be determined that the test end condition is not satisfied when the excess time is longer than a predetermined time.

In addition, the application decreasing test mode shown in FIG. 11 may repeat the test by decreasing the number of applications being executed when it is determined that the test end condition is not satisfied (S1860).

That is, the optimal number of executable applications may be found by monitoring system resource utilization during the test time while decreasing the number of applications being executed each time the test is performed.

In addition, the application decreasing test mode shown in FIG. 11 may find a maximum load point at which the system resource utilization is recorded as a maximum value during the test time and may reset the test time to a time at which the maximum load point is reached.

For example, when the system resource utilization is recorded as the maximum value at a point 05:30 during the test time of 7 minutes, the point 05:30 is the maximum load time. Then, since the test time is reset to the point 05:30, subsequent tests may be performed only for 5 minutes 30 seconds, thereby saving 1 minute 30 seconds.

According to an embodiment, the system resource utilization may be determined in consideration of one or both of the CPU utilization and the GPU utilization.

For example, the system resource utilization may be determined as the average of the CPU utilization and the GPU utilization or may be considered as whichever is higher between the CPU utilization and the GPU utilization at each time. Alternatively, a later point between a point at which the CPU utilization is recorded as a maximum value and a point at which the GPU utilization is recorded as a maximum value may be considered as the maximum load point.

When it is determined that the test end condition is satisfied, the application decreasing test mode shown in FIG. 11 ends the test and calculates the optimal number of executable applications (S1880).

In this case, the optimal number of executable applications may be a number indicating an upper limit at which a plurality of test applications may be reliably executed when the cloud streaming server executes the plurality of test applications.

In this case, the optimal number of executable applications may be the number of applications being executed when the test end condition is satisfied.

That is, the number of applications being executed in the first test in which the CPU utilization and the GPU utilization do not exceed the maximum CPU utilization and the maximum GPU utilization, respectively, may be equal to the optimal number of executable applications.

For example, on a condition that the number of applications being executed is four, that is, four test applications are being executed, when the test end condition is satisfied, the optimal number of executable applications may be four.

The steps shown in FIGS. 11, 12, and 13 may be performed in the order shown in FIGS. 11, 12, and 13, in the opposite order, or concurrently.

The cloud streaming server test method according to the present invention may be implemented as a program or a smartphone app that may be performed through various computer means. In this case, the program or the smartphone app may be recorded in a computer-readable medium. The computer-readable medium may also include a program instruction, a data file, a data structure, or a combination thereof. The program instruction recorded in the medium may be designed and configured specifically for the present invention or can be publicly known and available to those skilled in the field of computer software. Examples of the computer-readable medium include a magnetic medium such as a hard disk, a floppy disk, and a magnetic tape, an optical medium such as a CD-ROM and a DVD, a magneto-optical medium such as a floptical disk, and a hardware device such as a ROM, a RAM, a flash memory, etc. that is specifically configured to store and perform the program instruction. Examples of the program instruction may include a high-level language code executable by a computer with an interpreter, in addition to a machine language code made by a compiler. The above exemplary hardware device can be configured to operate as one or more software modules in order to perform the operation of the present invention, and vice versa.

As described above, the cloud streaming server test method and the apparatus therefor according to the present invention are not limited to the configurations and methods of the above-described embodiments, and various modifications to the embodiments may be made by selectively combining all or some of the embodiments.

A test technique for detecting, in advance, whether a cloud streaming server operates normally to prevent deterioration in service quality due to a server failure will be described below.

Figure 14:
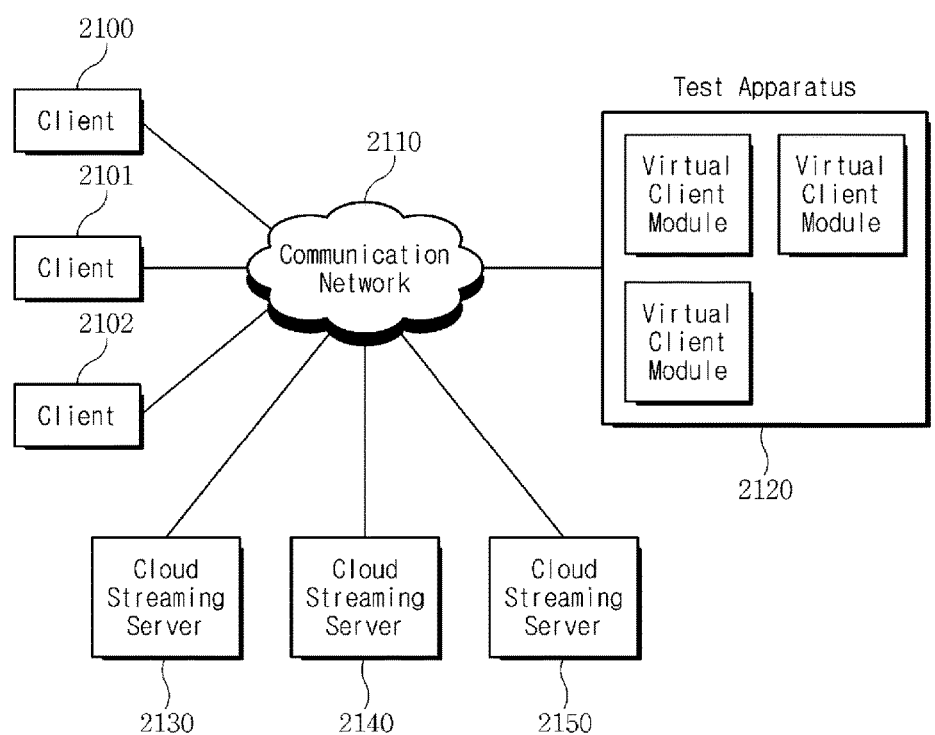
FIG. 14 is a diagram showing a test system for a cloud streaming server according to an embodiment of the present invention.

FIG. 14 is a diagram showing a test system for a cloud streaming server according to an embodiment of the present invention.

Referring to FIG. 14, a cloud streaming system according to the present invention is composed of a plurality of clients 2100, 2101, and 2102 and a plurality of cloud streaming servers 2130, 2140, and 2150, which are connected through a communication network 2110. The present invention further includes a test apparatus 2120 that is connected with the plurality of cloud streaming servers 2130, 2140, and 2150 over the communication network 2110 and that includes virtual client modules that perform at least some functions of the plurality of clients 2100, 2101, and 2102, in order to test whether such a cloud streaming system operates normally.

In the following embodiment, three cloud streaming servers 2130, 2140, and 2150 and one test apparatus 2120 including three virtual client modules are shown.

However, the number of cloud streaming servers and the number of virtual client modules are not limited thereto, and may be implemented in various combinations depending on need or design.

The clients 2100, 2101, and 2102 refer to terminals that may transmit and receive various kinds of data via the communication network 2110, and in particular, refer to user-side devices that connect to the cloud streaming servers 2130, 2140, and 2150 to provide a cloud streaming service. For example, the clients 2100, 2101, and 2102 may be any one of a tablet PC, a laptop, a PC, a smart phone, a PDA, a smart TV, a mobile communication terminal, and a set-top box.

In addition, the clients 2100, 2101, and 2102 refer to terminals that are each provided with a browser for communicating with the cloud streaming servers 2130, 2140, and 2150 via the communication network 2110, a memory for storing programs and protocols, a microprocessor for executing various programs to perform arithmetic and control operations, etc. That is, the clients 2100, 2010, and 2102 may be any of terminals that may enable communication with the cloud streaming servers 2130, 2140, and 2150 and may include all types of communication computing devices such as a laptop, a mobile communication terminal, and a PDA in a broader sense.

For example, the clients 2100, 2101, and 2102 may connect to the cloud streaming servers 2130, 2140, and 2150, request a specific service or function according to a user input, receive a result screen obtained by executing the requested service or function from the streaming servers 2130, 2140, and 2150, and output the received result screen.

The cloud streaming servers 2130, 2140, and 2150 may be configured to provide a specific service or function to the plurality of clients 2100, 2101, and 2102 through the communication network 2110, and in particular, may provide a cloud streaming service. For example, in order to provide a predetermined service or function, for example, a service or function that requires high-performance image processing regardless of an OS type, CPU performance, memory capacity, and other software and hardware specifications of the clients 2100, 2101, and 2102, the cloud streaming servers 2130, 2140, and 2150 may perform the service or function according to a user input transmitted from the clients 2100, 2101, and 2102, and then may transmit a result screen to the clients 2100, 2101, and 2102. For this, the cloud streaming servers 2130, 2140, and 2150 may be provided with a screen virtualization function. In particular, in order to test whether an operation is normal (that is, whether it has a failure), the cloud streaming servers 2130, 2140, and 2150 according to the present invention may receive a predetermined test script key input and may transmit a test result (that is, a test result screen) generated on the basis of the predetermined test script key input to the virtual client modules of the test apparatus 2120.

The communication network 2110 refers to a network capable of transmitting and receiving data using an Internet protocol in various wired/wireless communication technologies such as the Internet, an intranet, a mobile communication network, a satellite communication network, etc. The communication network 2110 collectively refers to a Code Division Multiple Access (CDMA) network, a Wideband Code Division Multiple Access (WCDMA) network, a Global System for Mobile Communications (GSM) network, a Long Term Evolution (LTE) network, an Evolved Packet Core (EPC) network, and next generation networks and computing networks, in addition to a closed network (e.g., a local area network (LAN), a wide area network (WAN), etc.) and an open network (e.g., the Internet).

The test apparatus 2120 is a device for testing whether the cloud streaming servers 2130, 2140, and 2150 operate normally. The test apparatus 2120 is provided with at least one virtual client module having some functions of the clients 2100, 2102, and 2102.

When a test result transmitted from at least one of the cloud streaming servers 2130, 2140, and 2150 is received by the at least one virtual client module and the at least one virtual client module performs data processing on the received test result and outputs a result image to a screen, the test apparatus 2120 captures a result image, compares the captured result image with a predetermined reference result image, and determines whether the at least one cloud streaming server has a failure according to a matching degree. In more detail, when the at least one virtual client module performs data processing such as decoding on a test result received from a specific cloud streaming server 2130 and then outputs a result image to a screen, the test apparatus 2120 compares the result image output at a predetermined capture time with a predetermined reference result image (the reference result image may correspond to one of the cloud streaming servers to be tested), determines that the cloud streaming server 2130 has a failure and thus does not operate normally when the images do not match each other, and determines that the cloud streaming server 2130 operates normally when the images match each other. However, the test apparatus 2120 repeatedly transmits the same key script input, detects a region having no differences in an operation case image generated through the test result to generate a reference region, and then performs the comparison on only reference regions. In this case, the capture time is may be set on the basis of a time at which the test result is transmitted from the at least one of the streaming servers 2130, 2140, and 2150 and may be prestored in the test apparatus 2120.

For example, the test apparatus 2120 may compare a test result image generated by capturing a test result video corresponding to a reference server 2130 which is one of the cloud streaming servers 2130, 2140, and 2150 with a reference region of test result images generated by capturing test result videos corresponding to the other cloud streaming servers 2140 and 2150 to determine whether one or more of the cloud streaming servers 2130, 2140, and 2150 have failures, and may change the reference server 2130 to another server 2140 or 2150 when it is determined that changing the reference server 2130 is needed (that is, when a condition for the change is satisfied).

In this case, the change condition may be a condition in which the number of cloud streaming servers that are determined as having failures among the cloud streaming servers is a predetermined reference value or more.

The test apparatus 2120 may detect a connection error to the cloud streaming servers 2130, 2140, and 2150. For example, when a failed attempt to connect to the cloud streaming servers 2130, 2140, and 2150 is received or when a test result is not received from the cloud streaming servers 2130, 2140, and 2150 for a predetermined time or more, the test apparatus 2120 may determine the connection error. That is, when an attempt to connect to the cloud streaming server is failed or when a cloud streaming service screen is not transmitted from the cloud streaming server, the test apparatus 2120 may notify of a connection failure separately from a test through screen comparison.

The test apparatus 2120 may perform the comparison on only a reference region of a test result image having no differences with respect to the same input.

For this, any one of the virtual client modules may receive test results corresponding to a repeated test script key input from any one of the cloud streaming servers, generate operation case videos, capture the operation case videos, compare the generated operation case images with each other, and generate a reference region according to a result of the comparison.

In this case, as a result of the comparison of the operation case images, the virtual client module may detect a region having no differences, and generate the region as the reference region.

In this case, a region having a difference with respect to the same test script key input may be a region in which a clock or animation is displayed.

As described above, according to the present invention, on a condition that the virtual client modules receive test results from different cloud streaming servers, the test apparatus 2120 may compares a result image output by at least one of the virtual client modules that have received the test results from a different cloud streaming servers with a reference result image to determine whether a cloud streaming server operates normally according to a result of the comparison. That is, the test apparatus 2120 determines whether the cloud streaming servers 2130, 1240, and 2150 operate normally on the basis of screen images that are actually provided to the user by the clients 2100, 2101, and 2102. However, the comparison is performed on only the reference region having no differences with respect to the same input. For this, the test apparatus 2120 may request the at least one or more cloud streaming servers 2130, 2140, and 2150 to simultaneously transmit test results. According to the request signal, the cloud streaming servers 2130, 2140, and 2150 may transmit the test results. In addition, a virtual client module that will receive the test results transmitted from the at least one or more cloud streaming servers 2130, 2140, and 2150 and process the received test results may be predetermined That is, the at least one or more cloud streaming servers 2130, 2140, and 1250 and at least one or more virtual client modules may be mapped on a one-to-one basis or a many-to-one basis. Thus, when the test apparatus 2120 requests the at least one or more cloud streaming servers 2130, 2140, and 2150 to transmit the test results, the test apparatus 2120 may transmit information regarding a virtual client module that will receive the test results together. In addition, when the virtual client module is mapped with two or more of the cloud streaming servers, the test apparatus 2120 may control times at which the at least one or more cloud streaming servers 2130, 2140, and 2150 are requested to transmit the test results in order to sequentially receive and process the test results from the two or more cloud streaming servers.

A configuration of the test apparatus 2120 in the system having the above-described configuration according to an embodiment of the present invention will be described in detail with reference to FIGS. 15, 16, and 17.

Figure 15:
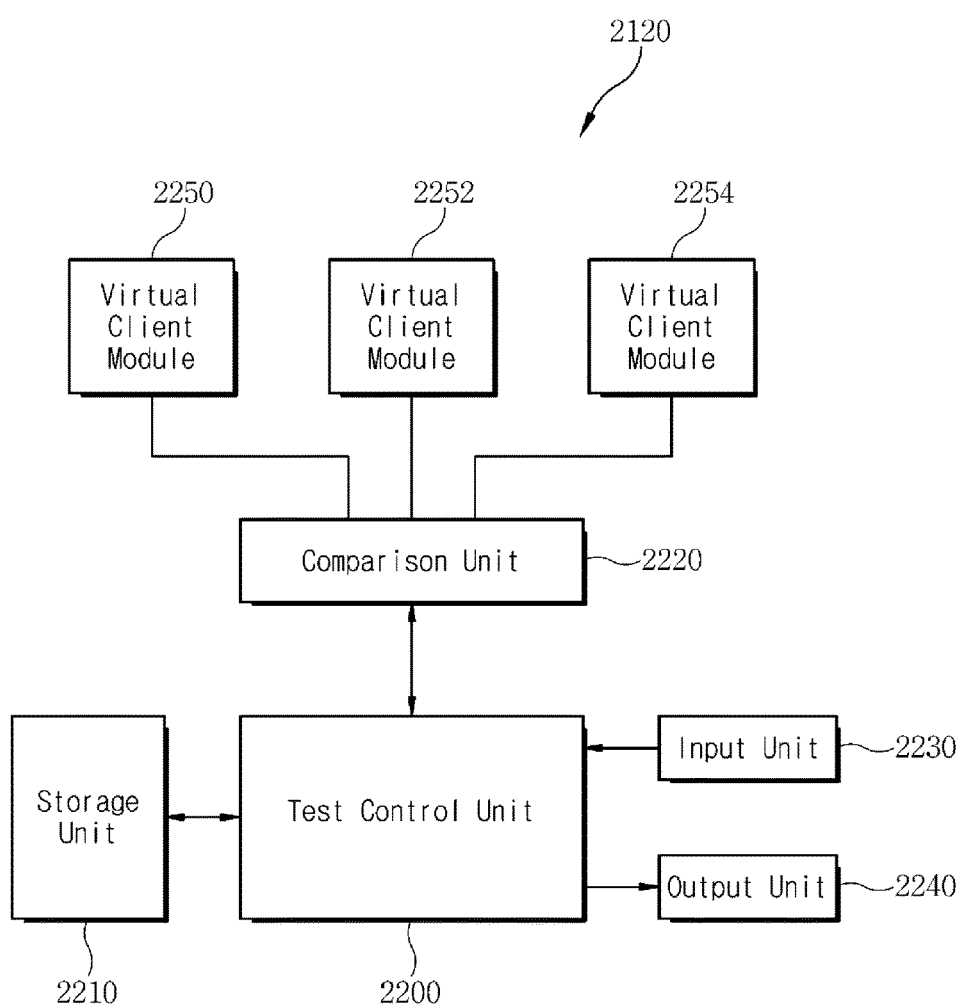
FIG. 15 is a diagram showing a cloud streaming server test apparatus according to an embodiment of the present invention.

First, referring to FIG. 15, the test apparatus 2120 may be configured to include a test control unit 2200, a storage unit 2210, a comparison unit 2220, an input unit 2230, an output unit 2240, and at least one or more virtual client modules 2250, 2252, and 2254. In this embodiment, the number of virtual client modules 2250, 2252, and 2254 is three, but may be changed according to a system operation method.

The test control unit 2200 performs all control operations needed to determine whether the cloud streaming servers 2130, 2140, and 2150 have failures, and determines whether the cloud streaming servers have failures according to a result of a comparison performed through the comparison unit 2220, that is, whether a result image obtained by capturing a screen output according to the test result matches a predetermined reference result image when the failure determination is required. However, the matching is performed on only a reference region having no differences with respect to the same input. In this case, a time at which the failure determination is required may be a time at which a reception of test results by the virtual client modules 2250, 2252, and 2254 is detected and completed, a time at which the failure determination is required through the input unit 2230, or a time which is determined according to a predetermined period. The demand for the failure determination may be generated according to settings. In addition, the reference result image may be prestored. Alternatively, a result image output from a specific virtual client module among the at least one or more virtual client modules 2250, 2252, and 2254 may be set as the reference result image.

In this case, the test control unit 2200 may determine that the cloud streaming server does not have a failure when the two images match each other, and may determine that the cloud streaming server has a failure when the two images do not match each other.

The storage unit 2210 may store information needed to operate the test apparatus 2120. The storage unit 2210 stores capture time information for capturing a test result video in order to capture a result video for the test result transmitted from the at least one or more cloud streaming servers 2130, 2140, and 2150 at the same time. In addition, the storage unit 2210 may store default information regarding the test results transmitted from the cloud streaming servers, and in particular, may prestore a reference image for a specific time that is a reference for determining whether each of the cloud streaming servers has a failure. The storage unit 2210 includes a magnetic medium such as a hard disk, a floppy disk, and a magnetic tape, an optical medium such as a CD-ROM and a DVD, a magneto-optical medium such as a floptical disk, a ROM, a RAM, and a flash memory.

The comparison unit 2220 may require an operation case video that is repeatedly received by any one of the virtual client modules and output to a screen to be transferred, and may compare operation case images generated by capturing the operation case video to generate a reference region.

In addition, the comparison unit 2220 may require a test result video that is received from each of the virtual client modules 2250, 2252, and 2254 and output to the screen under the control of the test control unit 2200 to be transferred, compare a test result image generated by capturing the test result video with the reference result image, and then output a result of the comparison to the test control unit 2200. For this, the comparison unit 2220 may further perform a process of setting the reference result image. That is, the comparison unit 2220 may compare a test result image generated by capturing a test result video corresponding to a reference server, which is one of the cloud streaming servers with test result images generated by capturing test result videos corresponding to the other cloud streaming servers.

In this case, the test result images corresponding to the other cloud streaming servers may be captured at the same time as the test result image corresponding to the reference server.

In this case, the comparison may be performed on only a reference region when the comparison unit 2220 compares the test result images.

In this case, the reference region may be a region having no differences with respect to the same input. For example, the reference region may be a remaining region other than a region for displaying a clock or animation.

The input unit 2230 may generate a user input signal corresponding to a request or information of a cloud streaming server manager according to the cloud streaming server manager's manipulation and may be implemented as various input means that are commercially available or will be available in the future. For example, the input unit 2230 may include a gesture input means for sensing the user's motion and generating a specific input signal in addition to a general input device such as a key board, a mouse, a joystick, a touch screen, a touch pad, etc.

The output unit 2240 is a means for providing an operation result or state of the test apparatus 2120 such that the operation result or state may be recognized by a user. For example, the output unit 2240 may include a display that visually outputs a screen, a speaker that outputs audible sound, etc. In particular, according to the present invention, the output unit 2240 may visually output a result image that is processed and output by the at least one or more virtual client modules 2250, 2252, and 2254. In addition, the output unit 2240 may compare the result image with the reference result image and output a result of the comparison, or may display a result of whether the cloud streaming server has a failure.

The virtual client modules 2250, 2252, and 2254 may be configured to virtualize the clients 2100, 2101, and 2102 that connect to the cloud streaming servers 2130, 2140, and 2150 and receive the cloud streaming service, and may perform at least some functions of the clients 2100, 2101, and 2102. For example, the virtual client modules 2250, 2252, and 2254 may connect to specific cloud streaming servers 2130, 2140, and 2150, receive test results from the cloud streaming servers 2130, 2140, and 2150, perform the same processing (e.g., decoding, etc.) as the clients 2100, 2101, and 2102 on the received test result to generate an operation case video or a test result video, and output the generated operation case video or test result video to a screen through the output unit 2240. In this case, the virtual client modules 2250, 2252, and 2254 may capture a result image that is output to the screen at a specific time and may transfer the captured result image to the comparison unit 2220 according to a result image request of the comparison unit 2220. In this case, the capture time may be received from the comparison unit 2220 or may be predetermined and stored. For example, the capture of the result image may be performed by capturing image data stored in frame buffers of the virtual client modules 2250, 2252, and 2254. According to an embodiment, the comparison unit 2220 may capture the test result video to generate the test result image or may capture the operation case video to generate the operation case image.

That is, the virtual client modules 2250, 2252, and 2254 provide a test script key input to a cloud streaming server, receive a test result corresponding to the test script key input from the cloud streaming server, decode the received test result, and generate the operation case video and the test result video. In this case, the test result may be considered to be an encoded streaming video, and the operation case video or the test result video may be considered to be a decoded streaming video.

Figure 17:
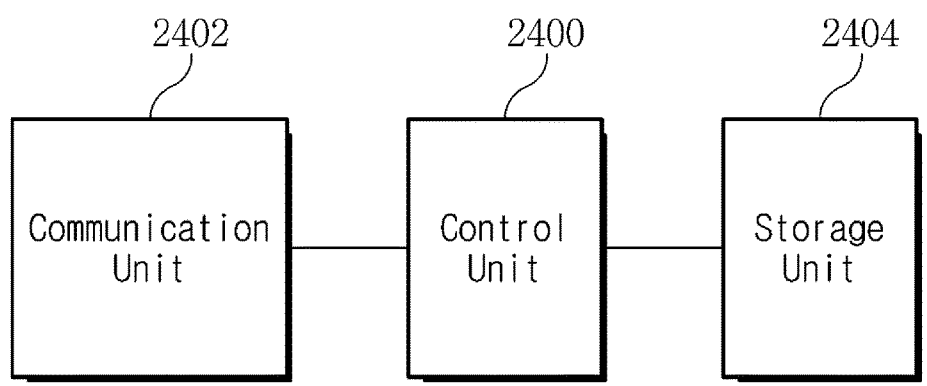
FIG. 17 is a diagram showing a configuration of a virtual client module that receives and processes a test result according to an embodiment of the present invention.

An internal configuration of the virtual client modules 2250, 2252, and 2254 may be as shown in FIG. 17. Since the virtual client modules 2250, 2252, and 2254 have the same configuration, the virtual client module having reference number 2250 will be described as an example in FIG. 17.

Figure 16:
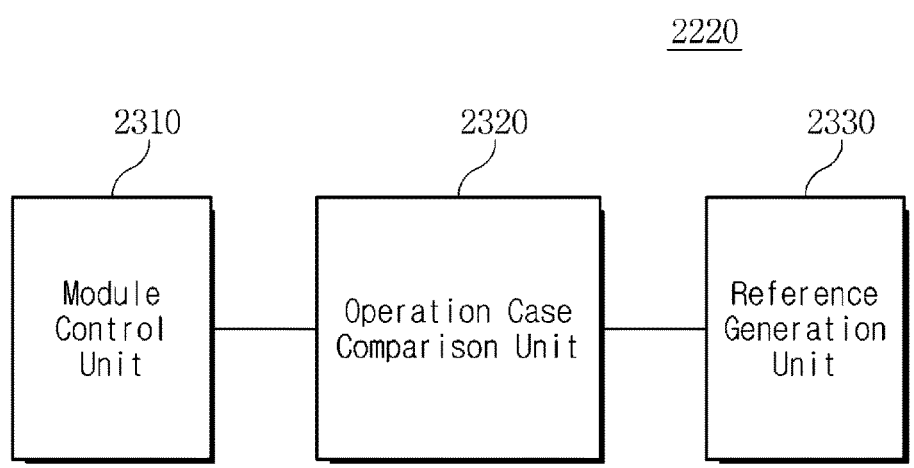
FIG. 16 is a diagram showing a comparison unit shown in FIG. 15.

FIG. 16 is a diagram showing a comparison unit shown in FIG. 15.

Referring to FIG. 16, the comparison unit shown in FIG. 15 includes a module control unit 2310, an operation case comparison unit 2320, and a reference generation unit 2330.

The module control unit 2310 performs control such that any one virtual client module receives test results corresponding to a repeated test script key input from any one cloud streaming server and generates operation case videos.

According to an embodiment, the module control unit 2310 may perform control such that the test results are received from a reference server.

The operation case comparison unit 2320 compares operation case images generated by capturing the operation case videos.

In this case, operation case images may be captured at the same time.

In this case, since the operation case videos are generated by the test results corresponding to the same test script key input, the same image has to be captured. However, there may be a region that changes irrespective of the input, and the comparison may be performed in order to detect such a region.

The reference generation unit 2330 generates a reference region according to a result of the comparison between the operation case images.

According to an embodiment, as a result of the comparison between the operation case images, the reference generation unit 2330 may detect a region having no differences with respect to the same test script key input and generate the region as the reference region.

For example, a remaining region other than a region such as a clock or animation may be generated as the reference region.

FIG. 17 is a diagram showing a configuration of a virtual client module that receives and processes a test result according to an embodiment of the present invention.

Referring to FIG. 17, the virtual client module 2250 may be configured to include a control unit 2400, a communication unit 2402, and a storage unit 2404.

The virtual client module 2250 may be implemented by virtualizing a terminal device (e.g., one of a tablet PC, a laptop, a PC, a smart phone, a PDA, a smart TV, a mobile communication terminal, and a set-top box) that may receive data provided from the cloud streaming servers 2130, 2140, and 2150. Accordingly, the virtual client module 2250 may be configured differently depending on the type of the terminal device. In particular, according to the present invention, the virtual client module 2250 may be implemented to perform a function of receiving a test result, a function of decoding the received test result, a function of generating a test result video, and also a function of outputting a screen.

The control unit 2400 performs overall control of the virtual client module 2250, and in particular, extracts a result image that is output to the screen at a specific time from the comparison unit 2220 according to the demand from the cloud streaming servers 2130, 2140, and 2150, and transfers the extracted result image to the comparison unit 2220. In addition, the control unit 2400 may transmit a transmission request signal for the test result to the cloud streaming servers 2130, 2140, and 2150 through the communication unit 2402. Upon transmitting the test result transmission request signal, the control unit 2400 may transmit identification information regarding a virtual client module that will receive the test result transmission request signal. In addition, according to a test schedule of a plurality of cloud streaming servers, the control unit 2400 may sequentially transmit the test result transmission request signal to each cloud streaming server.

The communication unit 2402 receives a test result transmitted from the cloud streaming servers 2130, 2140, and 2150 through the communication network 2110. The communication unit 2402 may transmit and receive data through various communication schemes including a wired scheme and a wireless scheme. In addition, the communication unit 2402 may transmit and receive data using one or more communication schemes. For this, the communication unit 2402 may include a plurality of communication modules that transmit and receive data according to different communication schemes.

The storage unit 2404 stores information needed to operate the virtual client module 2250, and in particular, may store the test results received from the cloud streaming servers 2130, 2140, and 2150. In addition, the storage unit 2404 may perform predetermined data processing on the received test result to ultimately store a test result video output to the screen and may also prestore capture time information of the result image according to the settings. The storage unit 2404 includes a magnetic medium such as a hard disk, a floppy disk, and a magnetic tape, an optical medium such as a CD-ROM and a DVD, a magneto-optical medium such as a floptical disk, a ROM, a RAM, and a flash memory.

Figure 18:
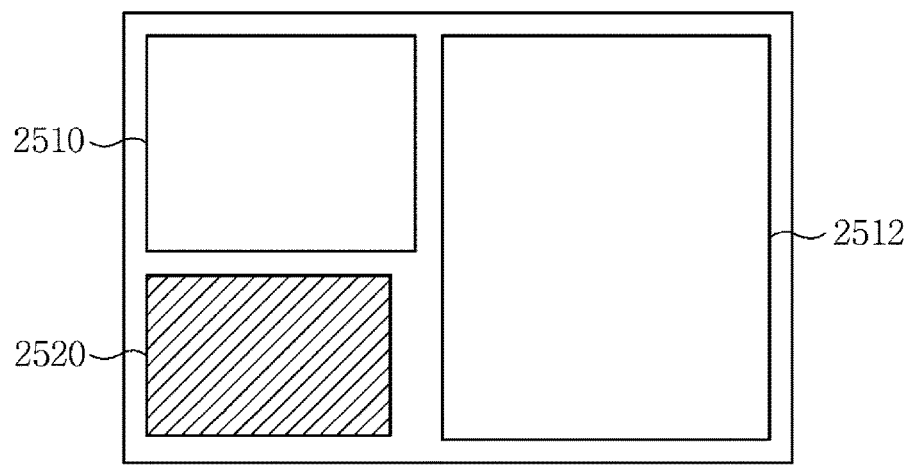
FIG. 18 is a diagram showing a reference region in a test result image according to an embodiment of the present invention.

FIG. 18 is a diagram showing a reference region in a test result image according to an embodiment of the present invention.

Referring to FIG. 18, the test result image according to an embodiment of the present invention is divided into three regions 2510, 2512, and 2520.

Any one virtual client module repeatedly transmits a key script input such that a result changes sequentially by the module control unit.

The virtual client module receives results of the repeated tests and generates operation case videos.

A test apparatus compares operation case images generated by capturing the operation case videos.

As a result of the comparison between the operation case images, when two regions 2510 and 2512 change regularly and one region 2520 changes irregularly each time the test is repeated, the test apparatus may generate each of the regions 2510 and 2512 having no differences as the reference region.

In this case, the region 2520 that changes irrespective of the input may be a region in which a clock or animation is displayed.

Then, a process of testing whether a cloud streaming server operates normally in a test system having the above-described configuration will be described in detail with reference to FIGS. 19 and 20.

Figure 19:
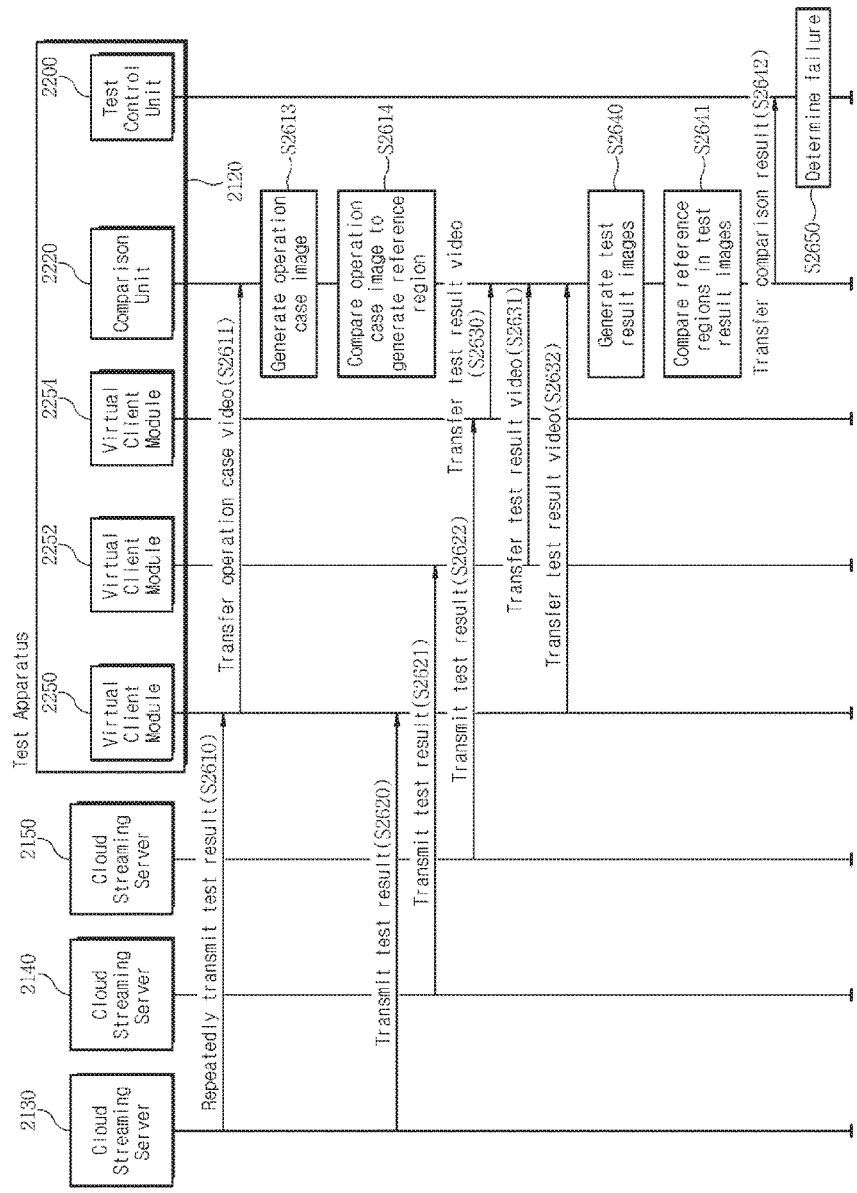
FIG. 19 is a flowchart showing a test process in a test system of a cloud streaming server according to an embodiment of the present invention.

FIG. 19 is a flowchart showing a process for testing whether a cloud streaming server operates normally in a test system according to an embodiment of the present invention.

The cloud streaming server 2130 repeatedly transmits a test result to the virtual client module 2250 of the test apparatus 2120 (S2610).

In this case, the cloud streaming server 2130 may transmit the test result in response to a test script key input of the virtual client module 2250.

In this case, the cloud streaming server 2130 may be a reference server.

The virtual client module 2250 decodes the test result received from the cloud streaming server 2130 to generate an operation case video and provides the operation case video to the comparison unit 2220 (S2611). The comparison unit 2220 generates an operation case image (S2613).

In this case, the provision of the operation case video may be performed in response to the demand for the test of the test control unit 2200. In this case, the comparison unit 2220 may request the virtual client module 2250 to transfer the test result received from the cloud streaming server 2130. In this case, the virtual client module 2250 may process the received test result to generate an operation case video like the actual client 2100, and then output the generated operation case video to a screen. In this case, the virtual client module 2250 may capture the operation case video output to the screen at a time required by the comparison unit 2220 or at a predetermined specific time and may transmit the captured operation case video to the comparison unit 2220. That is, the capturing of the operation case video and the generating of the operation case image may be performed by the virtual client module 2250 or the comparison unit 2220.

The comparison unit 2220 compares the operation case images to generate a reference region (S2614).

According to an embodiment, as a result of the comparison between the operation case images, the comparison unit 2220 may detect a region having no differences with respect to the same test script key input and generate the region as the reference region.

For example, a remaining region other than a region such as a clock or animation may be generated as the reference region.

The cloud streaming servers 2130, 2140, and 2150 simultaneously transmit test results to the virtual client modules 2250, 2252, and 2254 of the test apparatus 2120 (S2620 to S2622). That is, one cloud streaming server 2130 may transmit a test result to the virtual client module 2250, another cloud streaming server 2140 may transmit a test result to the virtual client module 2252, and the cloud streaming server 2150 may transmit a test result to the virtual client module 2254. Alternatively, one virtual client module may also sequentially receive the test results from the plurality of cloud streaming servers 2130, 2140, and 2150.

In this case, the cloud streaming servers 2130, 2140, and 2150 may transmit the test results in response to test script key inputs of the virtual client modules 2250, 2252, and 2254.

The virtual client modules 2250, 2252, and 2254 decode the test results received from the cloud streaming servers 2130, 2140, and 2150 to generate test result video and provide the generated test result video to the comparison unit 2220 (S2630 to S2632). In this case, the provision of the test result video may be performed in response to the demand for a test of test control unit 2200. In this case, the comparison unit 2220 may request the virtual client modules 2250, 2252, and 2254 to transfer the test results received from the cloud streaming servers 2130, 2140, and 2150. In this case, the virtual client modules 2250, 2252, and 2254 may process the received test results to generate test result videos like the actual clients 2100, 2102, and 2102, and then may output the generated test result videos to a screen. In this case, the virtual client modules 2250, 2252, and 2254 may capture the operation case videos output to the screen at the time required by the comparison unit 2220 or at the predetermined specific time and may transmit the captured operation case videos to the comparison unit 2220. That is, the capturing of the operation case video and the generating of the operation case image may be performed by the virtual client module 2250 or the comparison unit 2220.

The comparison unit 2220 compares a test result image obtained by capturing each of the received test result videos with a predetermined reference result image and then transfers a result of the comparison to the test control unit 2200 (S2424 and S2426). Here, the reference result image may be prestored as a result image that is displayed when the test result is transmitted and output normally, and the result image output from a predetermined specific virtual client module among the virtual client modules 2250, 2252, and 2254 may be set as the reference result image. For this, the comparison unit 2220 may further perform a process of setting the reference result image before performing the comparison.

In this case, when comparing the test result image with the reference result image, the comparison unit 2220 performs the comparison on only the reference region. This is because, though the images do not match each other, a region changing irrespective of input cannot be determined as having an error.

Then, the test control unit 2200 determines whether the cloud streaming server has a failure according to a result of the comparison. In this case, when the result of the comparison is that the result image captured in the received test result and the predetermined reference result image do not match each other, the test control unit 2200 determines that the cloud streaming server has a failure. When the images match each other, the test control unit 2200 determines that the cloud streaming server does not have a failure (S2427). In this case, a result of the comparison with respect to the cloud streaming servers having reference numbers 2130, 2140, and 2150 may be transferred to the test control unit 2200. The test control unit 2200 may determine whether each of the cloud streaming servers has a failure according to a result of the comparison.

Figure 20:
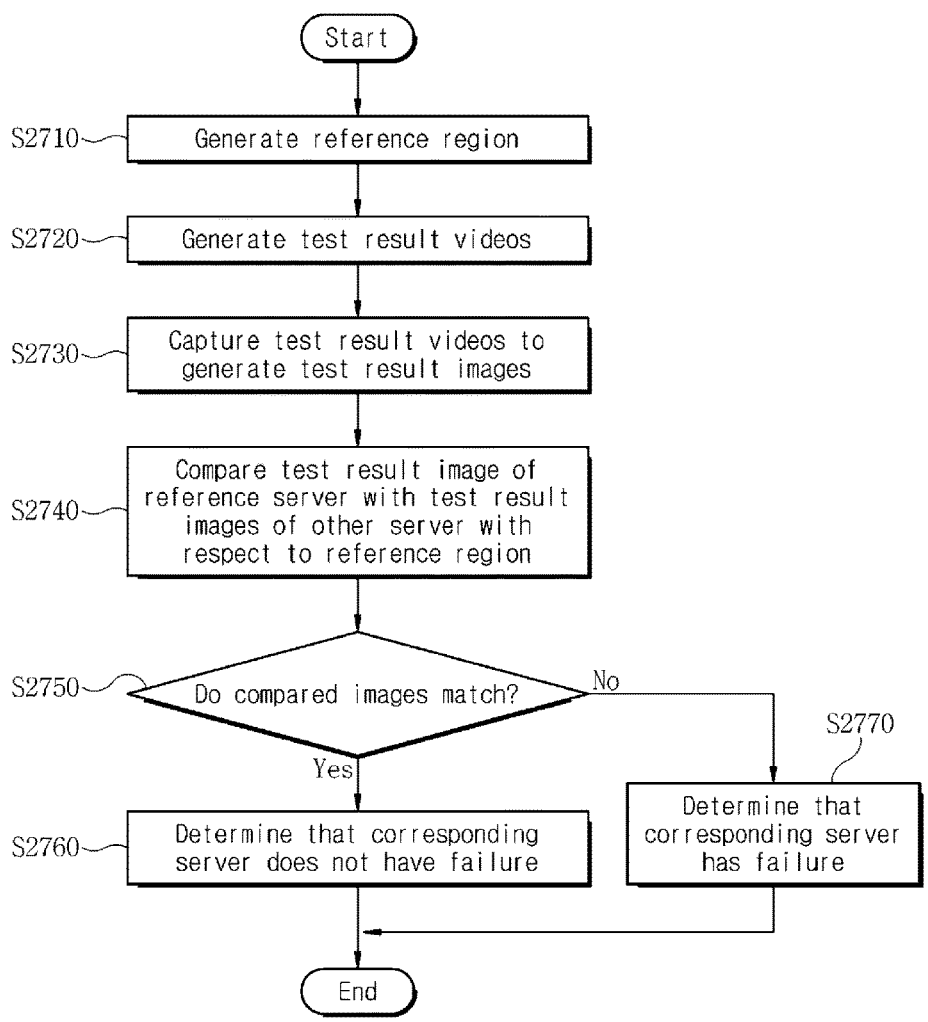
FIG. 20 is an operational flowchart showing a cloud streaming server test method according to an embodiment of the present invention.

FIG. 20 is an operational flowchart showing a method for testing whether the cloud streaming servers 2130, 2140, and 2150 operate normally in the test apparatus 2120 according to an embodiment of the present invention.

Referring to FIG. 20, a cloud streaming server test method according to an embodiment of the present invention includes generating a reference region (S2710). The step of generating the reference region will be described in detail with reference to FIG. 21.

In addition, the cloud streaming server test method according to an embodiment of the present invention includes transmitting a key input corresponding to a test script to cloud streaming servers by virtual client modules, receiving test results from the cloud streaming servers by the virtual client modules, and generating test result videos (S2720).

In addition, the cloud streaming server test method according to an embodiment of the present invention includes capturing the test result videos to generate test result images (S2730).

In this case, the test result images corresponding to the cloud streaming servers may be captured at the same time as a test result image corresponding to a reference server.

In this case, step S2730 may be performed by the virtual client modules 2250, 2252, and 2254 shown in FIG. 15 or by the comparison unit 2220.

In addition, the cloud streaming server test method according to an embodiment of the present invention includes comparing the test result image of the reference server with the test result images of other cloud streaming servers to determine whether a result of the comparison is that the images match each other (S2740, S2750).

In this case, when comparing the test result images, the comparison is performed on only the reference region. This is because it is difficult to determine that a region that changes irrespective of input has an error when the images do not match each other.

The cloud streaming server test method according to an embodiment of the present invention includes determining that the cloud streaming server doesn't have a failure when the result of the comparison is that the images match each other (S2760).

The cloud streaming server test method according to an embodiment of the present invention includes determining that the cloud streaming server has a failure when the result of the comparison is that the images do not match each other (S2770).

Figure 21:
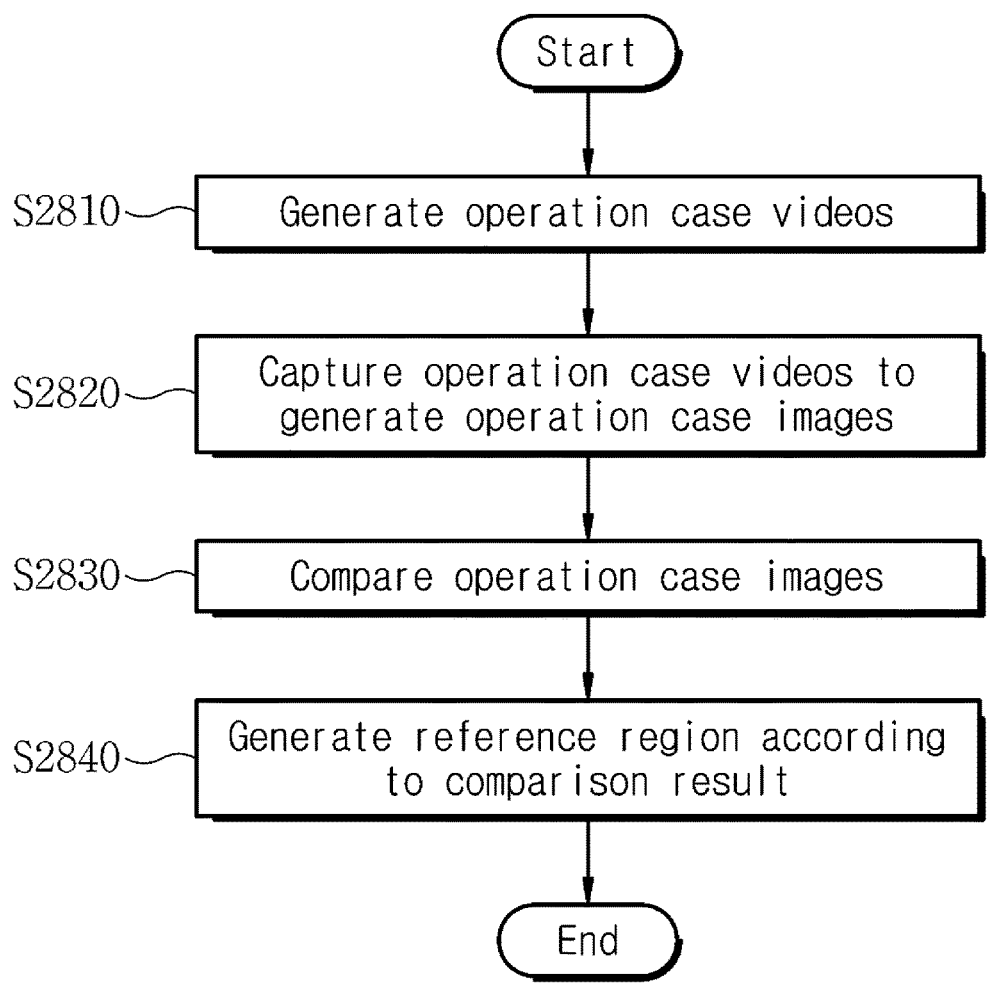
FIG. 21 is an operational flowchart showing a step of generating a reference region shown in FIG. 20.

FIG. 21 is an operational flowchart showing a step of generating a reference region shown in FIG. 20.

Referring to FIG. 21, the step of generating the reference region shown in FIG. 20 includes receiving test results corresponding to a repeated test script key input from any one of the cloud streaming servers and generating operation case videos by any one of the virtual client modules (S2810).

In this case, the any one of the virtual client modules may receive the test results from a reference server.

In addition, the step of generating the reference region shown in FIG. 20 includes comparing operation case images generated by capturing the operation case videos (S2820).

In this case, the operation case images may be captured at the same time.

In this case, since the operation case videos are generated by test results corresponding to the same test script key input, the same image has to be captured. However, there may be a region that changes irrespective of input, and the comparison may be performed in order to detect such a region.

In addition, the step of generating the reference region shown in FIG. 20 includes generating the reference region according to a result of the comparison between the operation case images (S2830).

According to an embodiment, as a result of the comparison between the operation case images, the reference generation unit 2330 may detect a region having no differences with respect to the same test script key input and generate the region as the reference region.

For example, a remaining region other than a region such as a clock or animation may be generated as the reference region.

The steps shown in FIGS. 19, 20, and 21 may be performed in the order shown in FIGS. 19, 20, and 21, in the opposite order, or concurrently.

The cloud streaming server test method according to the present invention may be implemented as a program or a smartphone app that may be performed through various computer means. In this case, the program or the smartphone app may be recorded in a computer-readable medium. The computer-readable medium may also include a program instruction, a data file, a data structure, or a combination thereof. The program instruction recorded in the medium may be designed and configured specifically for the present invention or can be publicly known and available to those skilled in the field of computer software. Examples of the computer-readable medium include a magnetic medium such as a hard disk, a floppy disk, and a magnetic tape, an optical medium such as a CD-ROM and a DVD, a magneto-optical medium such as a floptical disk, and a hardware device such as a ROM, a RAM, a flash memory, etc. that is specifically configured to store and perform the program instruction. Examples of the program instruction may include a high-level language code executable by a computer with an interpreter, in addition to a machine language code made by a compiler. The above exemplary hardware device can be configured to operate as one or more software modules in order to perform the operation of the present invention, and vice versa.

As described above, the cloud streaming server test method and the apparatus and system therefor according to the present invention are not limited to the configurations and methods of the above-described embodiments, and various modifications to the embodiments may be made by selectively combining all or some of the embodiments.

A cloud streaming server management system will be described below.

Figure 22:
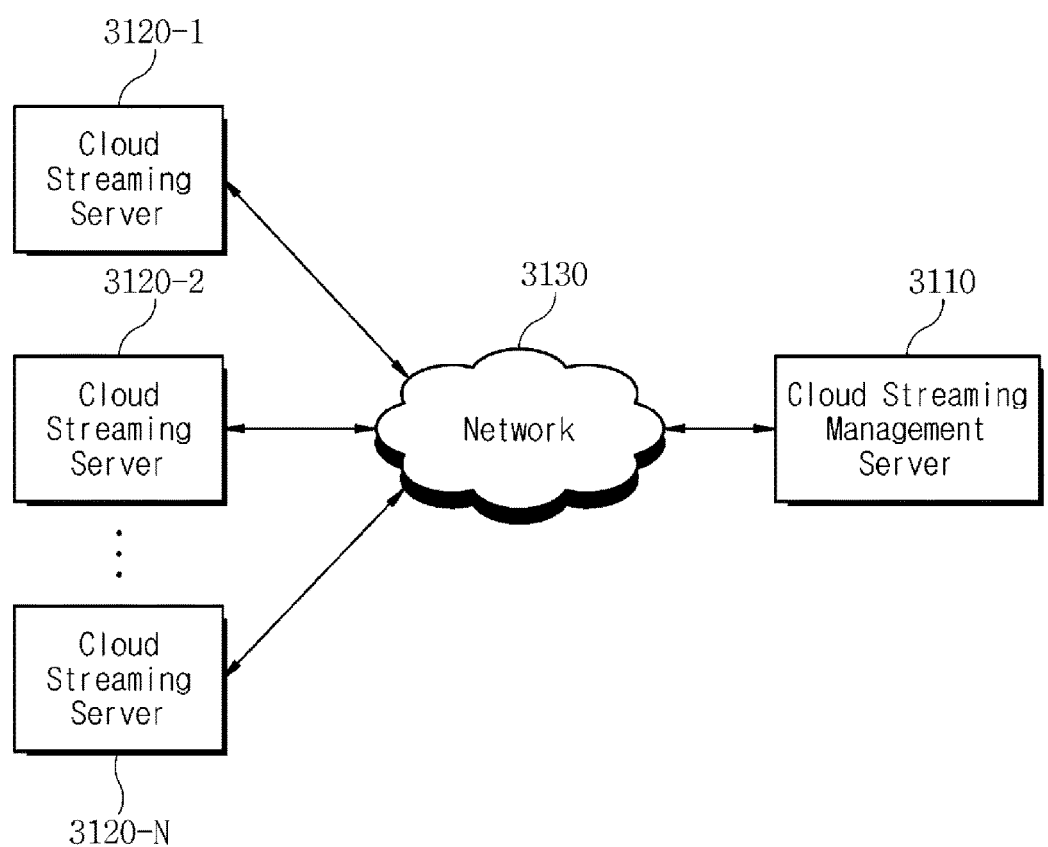
FIG. 22 is a block diagram showing a cloud streaming server management system according to an embodiment of the present invention.

FIG. 22 is a block diagram showing a cloud streaming server management system according to an embodiment of the present invention.

Referring to FIG. 22, the cloud streaming server management system according to an embodiment of the present invention includes a streaming management server 3110, cloud streaming servers 3120-1, 3120-2, . . . , 3120-N, and a network 3130.

The cloud streaming management server 3110 monitors real-time load information of a plurality of cloud streaming servers 3120-1, 3120-2, . . . , 3120-N, stores properties of the plurality of cloud streaming servers 3120-1, 3120-2, . . . , 3120-N, determines a representative server and a subordinate server among the plurality of cloud streaming servers 3120-1, 3120-2, . . . , 3120-N on the basis of the real-time load information, and receives backup copies of the properties from the representative server when a problem has occurred in a storage unit of the cloud streaming management server 3110 to restore the storage unit.

In this case, the representative server may receive the properties from the subordinate server and may store backup copies of the received properties.

In this case, the cloud streaming management server 3110 may transmit a subordinate server list to the representative server so that the representative server may request a backup copy of a property of the subordinate server.

In this case, the cloud streaming management server 3110 may divide the plurality of cloud streaming servers 3120-1, 3120-2, . . . , 3120-N into a plurality of groups and may determine a representative server and subordinate servers for each group on the basis of the real-time load information.

The cloud streaming servers 3120-1, 3120-2, . . . , 3120-N store their respective properties, transmit the properties to any one or both of the representative server and the cloud streaming management server 3110, and control the transmission of the properties according to a load of a cloud streaming server when a request is received from the representative server.

In this case, when each of the cloud streaming servers 3120-1, 3120-2, . . . , 3120-N is determined as the representative server by the cloud streaming management server, the representative server may further store the backup copy of the property of the subordinate server and may receive a request of the cloud streaming management server 3110 and transmit the backup copy.

In this case, each of the cloud streaming servers 3120-1, 3120-2, . . . , 3120-N may receive the subordinate server list from the cloud streaming management server 3110 and request the subordinate server to transmit the backup copy.

In this case, when the load is less than a predetermined level, each of the cloud streaming servers 3120-1, 3120-2, . . . , 3120-N may perform control such that the property is transmitted to the representative server and the cloud streaming management server 3110. Otherwise, each of the cloud streaming servers 3120-1, 3120-2, . . . , 3120-N may perform control such that the property is transmitted to only the representative server.

The network 3130 provides a passage for transferring data between the cloud streaming management server 3110 and the cloud streaming servers 3120-1, 3120-2, . . . , 3120-N and conceptually covers all networks that currently exist or that may be developed in the future. For example, the network 3130 may be implemented in one or any combination of a wired or wireless short-range communication network that provides communication with various kinds of information devices, a mobile communication network that provides communication between moving objects and between a moving object and an external object, a satellite communication network that provides communication between earth stations using a satellite, and a wired or wireless communication network. A standard transmission scheme of the network 3130 is not limited to existing standard transmission schemes and may include all standard transmission schemes which will be developed in the future. In addition, in FIG. 22, a network that is used between the cloud streaming management server 3110 and the cloud streaming server 3120-1 may be different from, or the same as, a network that is used between the cloud streaming management server 3110 and the cloud streaming server 3120-2. In addition, in FIG. 22, the network that is used between the cloud streaming management server 3110 and the cloud streaming server 3120-1 or the cloud streaming server 3120-2 may be different from, or the same as, a network that is used between the cloud streaming server 3120-1 and the cloud streaming server 3120-2.

Figure 23:
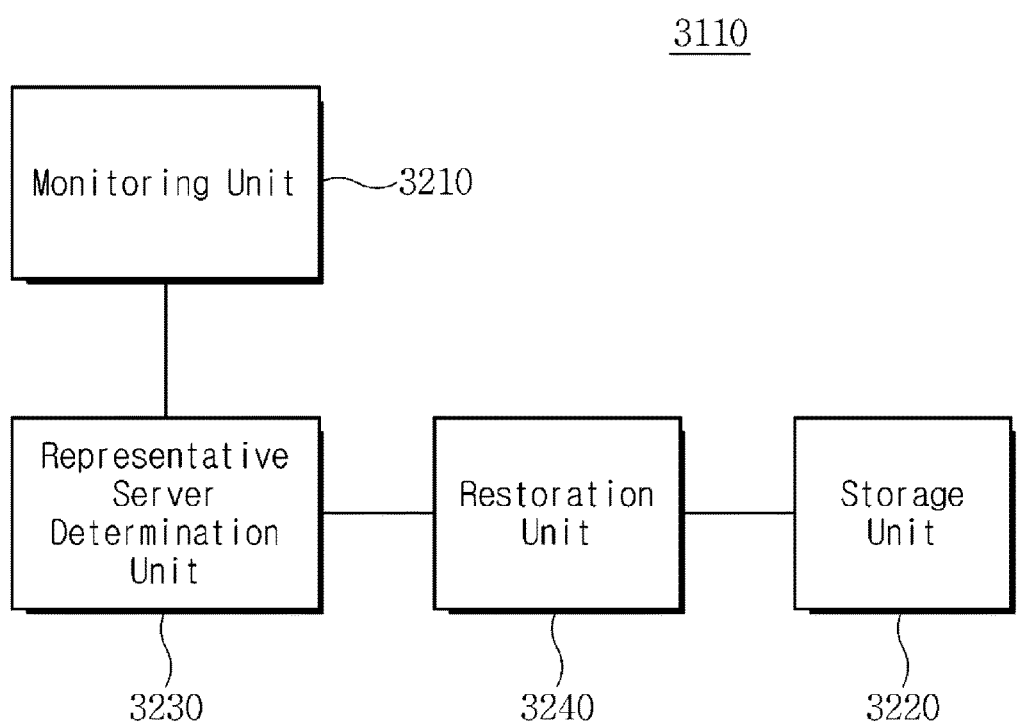
FIG. 23 is a block diagram showing an example of a cloud streaming management server shown in FIG. 22.

FIG. 23 is a block diagram showing an example of a cloud streaming management server shown in FIG. 22.

Referring to FIG. 23, the cloud streaming management server shown in FIG. 22 includes a monitoring unit 3210, a storage unit 3220, a representative server determination unit 3230, and a restoration unit 3240.

The monitoring unit 3210 monitors real-time load information of a plurality of cloud streaming servers.

In this case, the real-time load information may be one or any combination of a current number of users, CPU utilization, GPU utilization, and memory utilization of each of the cloud streaming servers.

The storage unit 3220 is a device for storing data, includes a main memory device and an auxiliary memory device, and stores an application program needed to operate a function of the cloud streaming management server. The storage unit 3220 may largely include a program area and a data area. In this case, the storage unit 3220 includes a magnetic medium such as a hard disk, a floppy disk, and a magnetic tape, an optical medium such as a CD-ROM and a DVD, a magneto-optical medium such as a floptical disk, a ROM, a RAM, and a flash memory. In particular, the storage unit 3220 according to the present invention stores properties of the plurality of cloud streaming servers.

In this case, the properties of the cloud streaming servers may be data regarding the cloud streaming servers. For example, each of the properties of the cloud streaming servers may be one or more of an ID, an IP address, a port number, a usage, a maximum number of connectors, and an app type of each of the cloud streaming servers.

The representative server determination unit 3230 determines a representative server and a subordinate server among the plurality of cloud streaming servers on the basis of the real-time load information.

In this case, the representative server determination unit 3230 may determine a cloud streaming server that has not been determined as the representative server as the subordinate server.

In this case, there may be one representative server, or a plurality of cloud streaming servers may be determined as representative servers.

According to an embodiment, the representative server determination unit 3230 may transmit a subordinate server list to the representative server in order to enable the representative server to request a backup copy of a property of the subordinate server.

In this case, when a plurality of representative servers are provided, a different subordinate server list may be transmitted to each of the plurality of representative servers.

In this case, the representative server may request a subordinate server included in the list to transmit its property.

According to an embodiment, the representative server may receive the property from the subordinate server and may store a backup copy of the received property.

According to an embodiment, the representative server determination unit 3230 may divide the plurality of cloud streaming servers into a plurality of groups, and may determine a representative server and subordinate servers for each group on the basis of the real-time load information.

In this case, a cloud streaming server having a low load in each group may be determined as the representative server, and the remaining cloud streaming servers in the group may be determined as subordinate servers.

When a problem has occurred in the storage unit 3220, the restoration unit 3240 receives the backup copy of the property from the representative server to restore the storage unit 3220.

In this case, the restoration unit 3240 may perform a function of transmitting and receiving data to and from a cloud streaming server over a network. Here, the restoration unit 3240 may include an radio frequency (RF) transmitting part that up-converts a frequency of a transmitted signal and amplifies the transmitted signal, an RF receiving part that low-noise-amplifies a received signal and down-converts a frequency of the received signal, etc. The restoration unit 3240 may include at least one of a wireless communication module (not shown) and a wired communication module (not shown). The wireless communication module is configured to transmit and receive data according to a wireless communication method. When the cloud streaming server uses wireless communication, the cloud streaming server may use any one of a wireless network communication module, a wireless LAN communication module, and a wireless PAN communication module to transmit and receive data to and from the cloud streaming management server or another cloud streaming server. The wired communication module is used to transmit and receive data in a wired manner. The wired communication module may connect to the network in a wired manner to transmit and receive data to the cloud streaming management server or another cloud streaming server. That is, the cloud streaming server may connect to the network using the wireless communication module or the wired communication module, and may transmit and receive data to and from the cloud streaming management server or another cloud streaming server over the network.

In this case, since the representative server stores backup copies of properties of subordinate servers, all properties of the all of the cloud streaming servers may be collected by collecting only information regarding the representative server. That is, the properties that have been stored in the storage unit may be restored in a short time.

Figure 24:
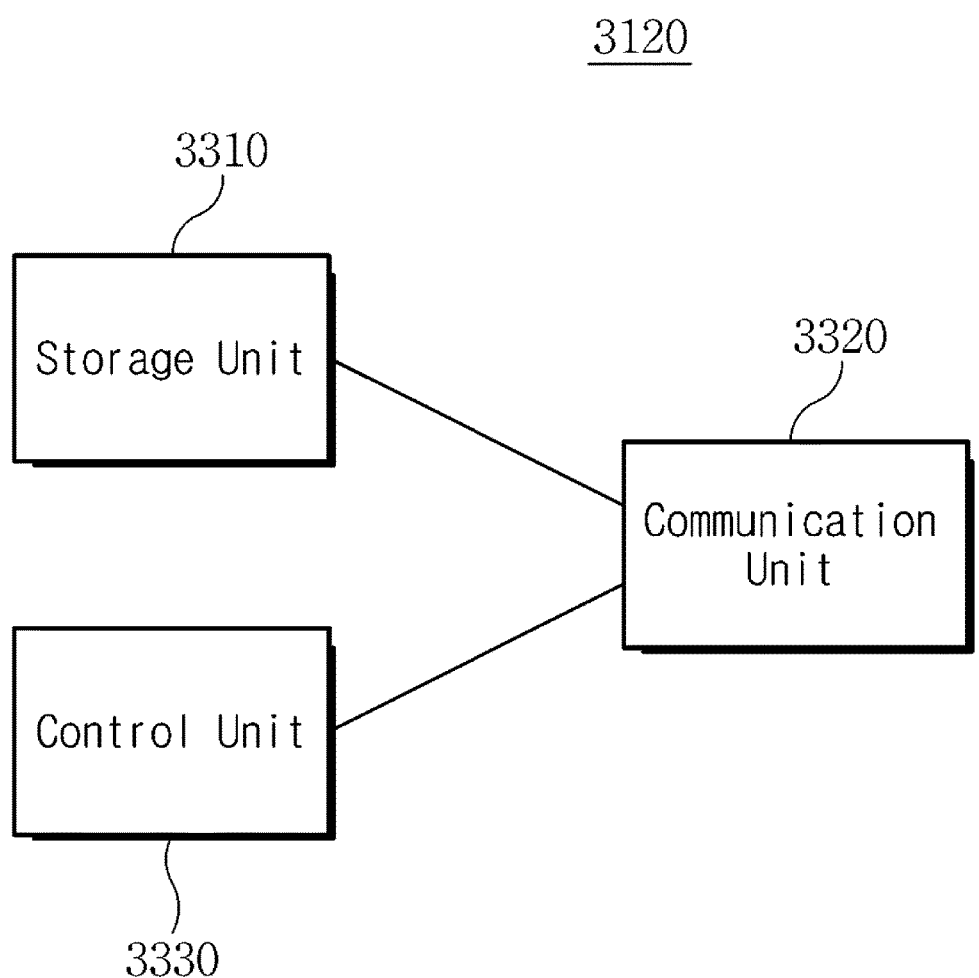
FIG. 24 is a block diagram showing an example of a cloud streaming server shown in FIG. 22.

FIG. 24 is a block diagram showing an example of the cloud streaming server shown in FIG. 22.

Referring to FIG. 24, the cloud streaming server shown in FIG. 22 includes a storage unit 3310, a communication unit 3320, and a control unit 3330.

The storage unit 3310 is a device for storing data, includes a main memory device and an auxiliary memory device, and stores an application program needed to operate a function of the cloud streaming server. The storage unit 3310 may largely include a program area and a data area. In this case, the storage unit 3310 includes a magnetic medium such as a hard disk, a floppy disk, and a magnetic tape, an optical medium such as a CD-ROM and a DVD, a magneto-optical medium such as a floptical disk, a ROM, a RAM, and a flash memory. In particular, the storage unit 3310 according to the present invention stores a property of the cloud streaming server.

According to an embodiment, when the cloud streaming server is determined as a representative server by the cloud streaming management server, the storage unit 3310 may further store a backup copy of a property of its subordinate server.

The communication unit 3320 performs a function of transmitting and receiving data to the cloud streaming management server and another cloud streaming server over a network. Here, the communication unit 3320 includes an RF transmitting part that up-converts a frequency of a transmitted signal and amplifies the transmitted signal, an RF receiving part that low-noise-amplifies a received signal and down-converts a frequency of the received signal, etc. The communication unit 3320 may include at least one of a wireless communication module (not shown) and a wired communication module (not shown). The wireless communication module is configured to transmit and receive data according to a wireless communication method. When the cloud streaming server uses wireless communication, the cloud streaming server may use any one of a wireless network communication module, a wireless LAN communication module, and a wireless PAN communication module to transmit and receive data to and from the cloud streaming management server or another cloud streaming server. The wired communication module is used to transmit and receive data in a wired manner. The wired communication module may connect to the network in a wired manner to transmit and receive data to the cloud streaming management server or another cloud streaming server. That is, the cloud streaming server may connect to the network using the wireless communication module or the wired communication module and may transmit and receive data to and from the cloud streaming management server or another cloud streaming server over the network. In particular, the communication unit 3320 according to the present invention transmits the property to one or both of the representative server and the cloud streaming management server.

In this case, the communication unit 3320 may transmit and receive data in various communication schemes including a wired manner and a wireless manner.

In this case, the communication unit 3320 may include a plurality of communication modules that transmit data according to different communication schemes.

In this case, when the property is transmitted to the representative server, the representative server may receive the property and may store its backup copy. In addition, when the property is transmitted to the cloud streaming management server, the cloud streaming management server may store the property of the cloud streaming server in order to provide a cloud streaming service.

According to an embodiment, when the cloud streaming server is determined as the representative server by the cloud streaming management server, the communication unit 3320 may transmit the backup copy when a request is received from the cloud streaming management server.

In this case, because the cloud streaming management server has a problem with its storage function, the transmission of the backup copy may be requested. When the representative server transmits the backup copy, the cloud streaming management server may receive the backup copy and perform restoration.

According to an embodiment, the cloud streaming server determined as the representative server may receive a subordinate server list from the cloud streaming management server and request the subordinate server to transmit the backup copy.

When the request is received from the representative server, the control unit 3330 controls the transmission of the property according to the load of the cloud streaming server.

According to an embodiment, the control unit 3330 may perform control such that the property is transmitted to the representative server and the cloud streaming management server when the load is lower than a predetermined level. Otherwise, the control unit 3330 may perform control such that the property is transmitted to only the representative server.

That is, when the cloud streaming server has a low load and thus spare resources, the cloud streaming server may transmit the property to the representative server to allow the representative server to store a backup copy of the property and may allow the cloud streaming management server to store the property. Conversely, when the cloud streaming server has a high load and thus no spare resources, the cloud streaming server may transmit the property to only the representative server.

In this case, when the property is transmitted to only the representative server, the representative server may transmit the property to the cloud streaming management server to enable the cloud streaming management server to hold the latest information.

Figure 25:
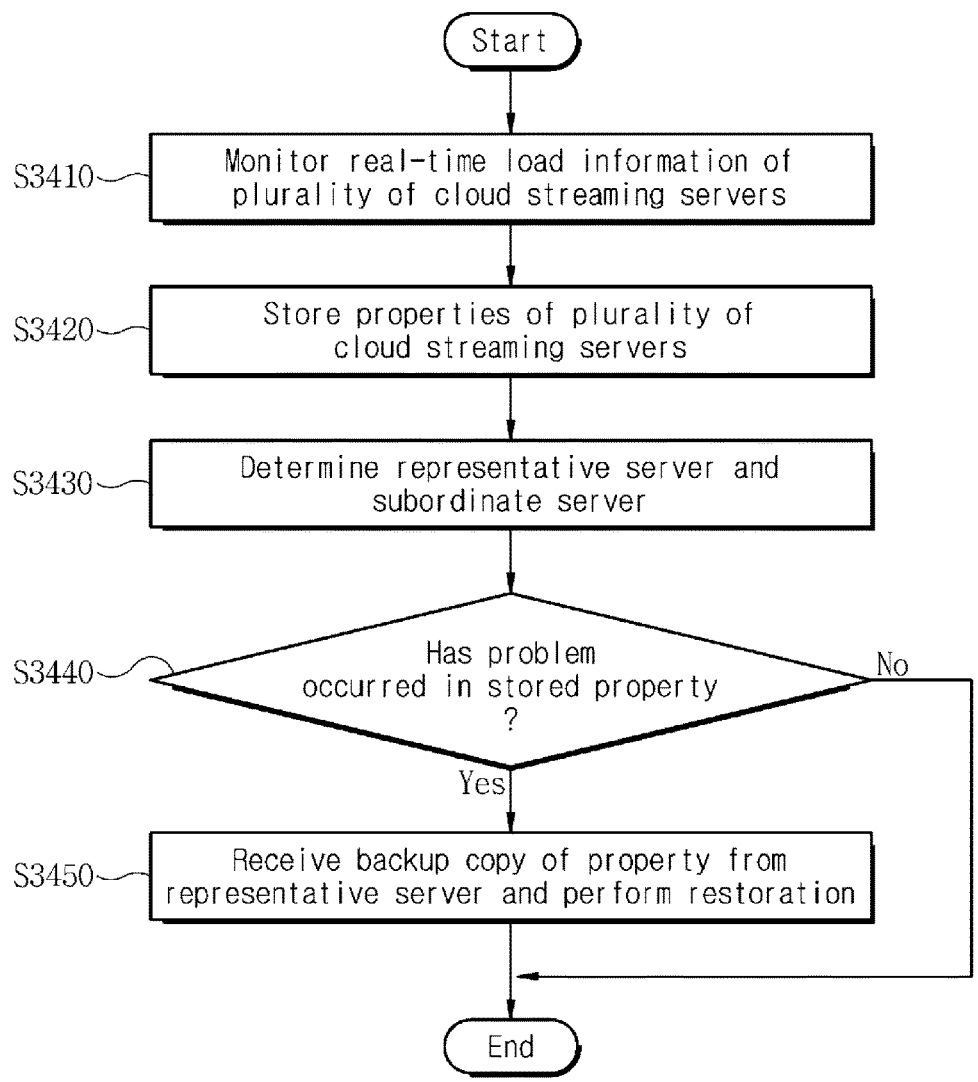
FIG. 25 is an operational flowchart showing an example of a cloud streaming server management method (in terms of a cloud streaming management server) according to an embodiment of the present invention.

FIG. 25 is an operational flowchart showing an example of a cloud streaming server management method (in terms of a cloud streaming management server) according to an embodiment of the present invention.

Referring to FIG. 25, the cloud streaming server management method according to an embodiment of the present invention includes monitoring real-time load information of a plurality of cloud streaming servers (S3410).

In this case, the real-time load information may be one or any combination of a current number of users, CPU utilization, GPU utilization, and memory utilization of each of the cloud streaming servers.

In addition, the cloud streaming server management method according to an embodiment of the present invention includes storing properties of the plurality of cloud streaming servers (S3420).

In this case, the properties of the cloud streaming servers may be data regarding the cloud streaming servers. For example, each of the properties of the cloud streaming servers may be one or more of an ID, an IP address, a port number, a usage, a maximum number of connectors, and an app type of each of the cloud streaming servers.

The cloud streaming server management method according to an embodiment of the present invention includes determining a representative server and a subordinate server among the plurality of cloud streaming servers on the basis of the real-time load information (S3430).

In this case, a cloud streaming server that has not been determined as the representative server may be determined as the subordinate server.

In this case, there may be one representative server, or a plurality of cloud streaming servers may be determined as representative servers.

According to an embodiment, the step of determining the representative server and the subordinate server may include transmitting a subordinate server list to the representative server in order to enable the representative server to request a backup copy of a property of the subordinate server.

In this case, when a plurality of representative servers is provided, a different subordinate server list may be transmitted to each of the plurality of representative servers.

In this case, the representative server may request a subordinate server included in the list to transmit its property.

According to an embodiment, the representative server may receive the property from the subordinate server and may store a backup copy of the received property.

According to an embodiment, the step of determining the representative server and the subordinate server may include dividing the plurality of cloud streaming servers into a plurality of groups and determining a representative server and subordinate servers for each group on the basis of the real-time load information.

In this case, a cloud streaming server having a low load in each group may be determined as the representative server, and the remaining cloud streaming servers in the group may be determined as the subordinate servers.

The cloud streaming server management method according to an embodiment of the present invention includes detecting whether a problem has occurred in the stored property (S3440).

The cloud streaming server management method according to an embodiment of the present invention includes receiving the backup copy of the property from the representative server and restoring the stored property when the stored property has a problem (S3450).

In this case, since the representative server stores backup copies of properties of the subordinate servers, all properties of the all of the cloud streaming servers may be collected by collecting only information regarding the representative server. That is, the properties that have been stored in the storage unit may be restored in a short time.

Figure 26:
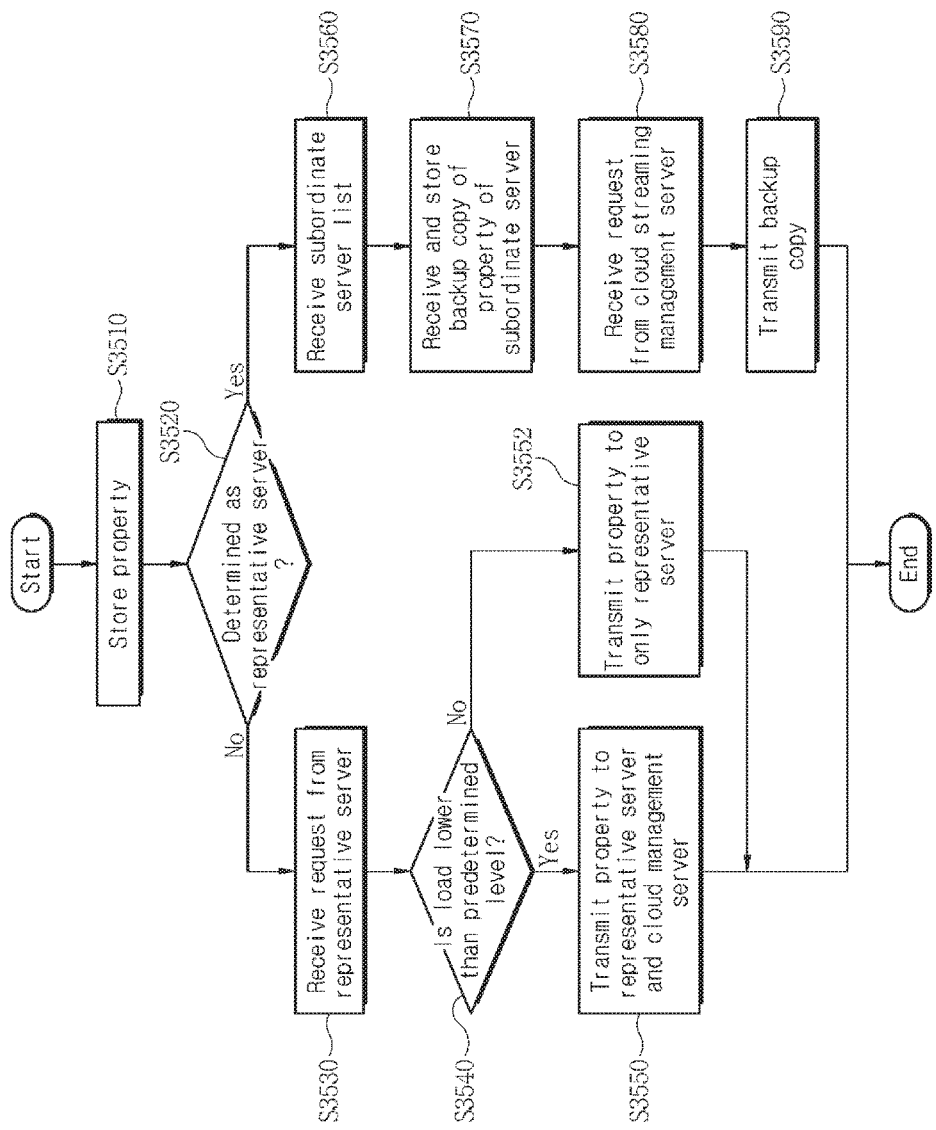
FIG. 26 is an operational flowchart showing an example of a cloud streaming server management method (in terms of a cloud streaming server) according to an embodiment of the present invention.

FIG. 26 is an operational flowchart showing an example of a cloud streaming server management method (in terms of a cloud streaming server) according to an embodiment of the present invention.

Referring to FIG. 26, the cloud streaming server management method according to an embodiment of the present invention includes storing a property (S3510).

In addition, the cloud streaming server management method according to an embodiment of the present invention includes receiving a request for the property from a representative server when a cloud streaming server is determined not as the representative server but as a subordinate server (S3530).

In addition, the cloud streaming server management method according to an embodiment of the present invention includes determining a load of the cloud streaming server (S3540), and performing control such that the property is transmitted to the representative server and the cloud streaming management server when the load is lower than a predetermined level (S3550).

In this case, when the property is transmitted to the representative server, the representative server may receive the property and may store its backup copy. In addition, when the property is transmitted to the cloud streaming management server, the cloud streaming management server may store the property of the cloud streaming server in order to provide a cloud streaming service.

In addition, the cloud streaming server management method according to an embodiment of the present invention includes performing control such that the property is transmitted to only the representative server when the load is not lower than the predetermined level (S3552).

That is, when the cloud streaming server has a low load and thus spare resources, the cloud streaming server may transmit the property to the representative server to allow the representative server to store a backup copy of the property and may allow the cloud streaming management server to store the property. Conversely, when the cloud streaming server has a high load and thus no spare resources, the cloud streaming server may transmit the property to only the representative server.

In this case, when the property is transmitted to only the representative server, the representative server may transmit the property to the cloud streaming management server to enable the cloud streaming management server to hold the latest information.

In addition, the cloud streaming server management method according to an embodiment of the present invention includes receiving a subordinate server list from the cloud streaming management server and requesting the subordinate server to transmit the backup copy (S3560) when the cloud streaming server is determined as the representative server (S3520).

In addition, the cloud streaming server management method according to an embodiment of the present invention includes receiving and storing the backup copy of the property of the subordinate server (S3570).

In addition, the cloud streaming server management method according to an embodiment of the present invention includes receiving a request from the cloud streaming management server (S3580).

In addition, the cloud streaming server management method according to an embodiment of the present invention includes transmitting the backup copy (S3590).

In this case, because the cloud streaming management server has a problem with its storage function, the transmission of the backup copy may be requested. When the representative server transmits the backup copy, the cloud streaming management server may receive the backup copy and perform restoration.

Figure 27:
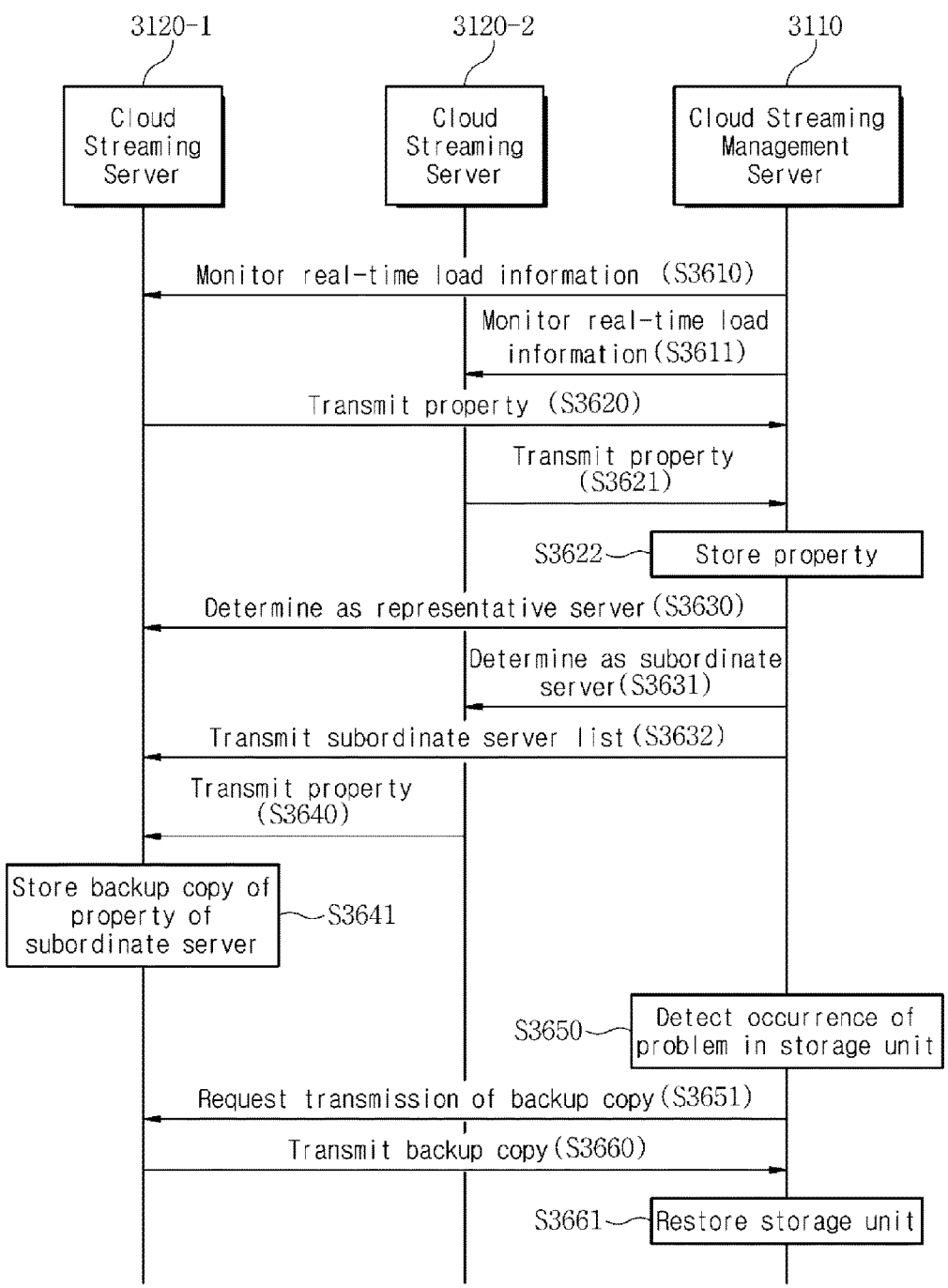
FIG. 27 is an operational flowchart schematically showing a cloud streaming server management method according to an embodiment of the present invention.

FIG. 27 is an operational flowchart schematically showing a cloud streaming server management method according to an embodiment of the present invention.

Referring to FIG. 27, the cloud streaming management server 3110 monitors real-time load information of the cloud streaming servers 3120-1 and 3120-2 (S3610, S3611).

The cloud streaming servers 3120-1 and 3120-2 each transmit their properties (S3620, S3621). Upon receiving the properties, the cloud streaming management server 3110 stores the received properties (S3622).

The cloud streaming management server 3110 determines the cloud streaming server 3120-1 as a representative server on the basis of the real-time load information (S3630). The cloud streaming server 3120-2 that has not been determined as the representative server is determined as a subordinate server (S3631).

In this case, the cloud streaming management server 3110 may divide the plurality of cloud streaming servers 3120-1 and 3120-2 into a plurality of groups and may determine a representative server and a subordinate server for each group on the basis of the real-time load information.

The cloud streaming management server 3110 may transmit a list of the subordinate server 3120-2 to the representative server 3120-1 so that the representative server 3120-1 may request a backup copy of a property of the subordinate server 3120-2.

The representative server 3120-1 requests the subordinate server 3120-2 to transmit the property of the subordinate server 3120-2. When the request is received, the subordinate server 3120-2 transmits the property (S3640).

In FIG. 27, the subordinate server 3120-2 has been shown as transmitting the property to only the representative server 3120-1, however, the subordinate server 3120-2 may transmit the property to the representative server 3120-1 and the cloud streaming management server 3110 when the load is lower than a predetermined level. Otherwise, the subordinate server 3120-2 may transmit the property to only the representative server.

The representative server 3120-1 receives the property and stores a backup copy of the property (S3641).

The cloud streaming management server 3110 detects that there is a problem with a storage unit (S3650).

The cloud streaming management server 3110 requests the representative server 3120-1 to transmit the backup copy of the property (S3651).

The representative server 3120-1 transmits the backup copy of the property to the cloud streaming management server 3110 (S3660).

The cloud streaming management server 3110 receives the backup copy of the property from the representative server 3120-1 and restores the storage unit (S3661).

FIG. 27 shows an example in which there are two cloud streaming servers 3120-1 and 3120-2. However, there may be even more cloud streaming servers. In addition, there may be even more representative servers and subordinate servers that are determined by the cloud streaming management server 3110.

The steps shown in FIGS. 25, 26, and 27 may be performed in the order shown in FIGS. 25, 26, and 27, in the opposite order, or concurrently.

The cloud streaming server management method according to the present invention may be implemented as a program or a smartphone app that may be performed through various computer means. In this case, the program or the smartphone app may be recorded in a computer-readable medium. The computer-readable medium may also include a program instruction, a data file, a data structure, or a combination thereof. The program instruction recorded in the medium may be designed and configured specifically for the present invention or can be publicly known and available to those skilled in the field of computer software. Examples of the computer-readable medium include a magnetic medium such as a hard disk, a floppy disk, and a magnetic tape, an optical medium such as a CD-ROM and a DVD, a magneto-optical medium such as a floptical disk, and a hardware device such as a ROM, a RAM, a flash memory, etc. that is specifically configured to store and perform the program instruction. Examples of the program instruction may include a high-level language code executable by a computer with an interpreter, in addition to a machine language code made by a compiler. The above exemplary hardware device can be configured to operate as one or more software modules in order to perform the operation of the present invention, and vice versa.

As described above, the cloud streaming server management system, the cloud streaming server management method, and the apparatus therefor according to the present invention are not limited to the configurations and methods of the above-described embodiments, and various modifications to the embodiments may be made by selectively combining all or some of the embodiments.

INDUSTRIAL APPLICABILITY

The present invention can prevent, in advance, an error or failure that may occur when an application is executed in a streaming server by determining whether an application execution screen matches a reference image to detect an application error when the application is executed in a server. The present invention can easily detect whether the application normally operates in the server, thus stabilizing a cloud streaming service and enhancing service quality. Accordingly, an application error detection technique for a cloud streaming service of the present invention will be significantly utilized.

In addition, according to the present invention, it is possible to automate a test of a cloud streaming server using an automatic testing script and also reduce an overall test time by finding a maximum load point at which system resource utilization is maximized during a test of the cloud streaming server and performing the test up to the maximum load point. Furthermore, it is possible to contribute to the development of industry by utilizing a result of the test of the cloud streaming server in the cloud streaming server service to provide a more efficient and appropriate service to a user.

In addition, the present invention relates to a system for testing whether a cloud streaming server that provides a specific service operates normally. In particular, by checking whether a server that provides the cloud streaming service operates normally, it is possible to prevent, in advance, a transmission error or failure that may occur in the cloud streaming server when data is transmitted and also easily detect whether the cloud streaming server operates normally, thereby stabilizing the cloud streaming service and enhancing service quality. Thus, the present invention can contribute to the development of industry.

According to the present invention, it is also possible to efficiently manage cloud streaming servers using a cloud streaming management server.

According to the present invention, it is also possible to determine a representative server among cloud streaming servers and store a backup copy of information about a cloud streaming server.

According to the present invention, it is also possible to receive a backup copy from a representative server and rapidly perform restoration when a problem has occurred in a database of a cloud streaming management server.

According to the present invention, it is also possible to resume a service in as short a time as possible when the service is stopped due to a problem with a database of a cloud streaming management server.

The invention claimed is:

1. An application error detection apparatus for a cloud streaming service, the application error detection apparatus comprising:
   a plurality of virtual client modules configured to:
      simultaneously receive, from a plurality of streaming servers, application execution data of a plurality of application execution data corresponding to a predetermined test script key input when a virtual client module of the plurality of virtual client modules is linked with a streaming server of the plurality of streaming servers;
      sequentially receive, from the plurality of streaming servers, the application execution data of the plurality of application execution data corresponding to the predetermined test script key input when the virtual client module of the plurality of virtual client modules is linked with at least two streaming servers of the plurality of streaming servers; and
      output application execution data received from the plurality of streaming servers to a screen;
   a comparison unit configured to:
      capture the application execution data output from at least one virtual client module of the plurality of virtual client modules; and
      compare a test image with a reference image, the test image generated from a reference region of captured application execution data
      received from a streaming server of the plurality of streaming servers; and
   a test control unit configured to determine whether the streaming server has a failure according to whether the test image and the reference image match each other,
   wherein the reference image is generated from the reference region of captured application execution data received from the streaming server of the plurality of streaming servers at a predetermined time, wherein the reference region is generated by detecting a region having no differences with respect to the predetermined test script key input among the capture application execution data received from the plurality of streaming servers, and wherein the test control unit determines that the streaming server does not have a failure when the test image and the reference image match each other and determines that the streaming server has a failure when the test image and the reference image do not match each other.

2. The application error detection apparatus of claim 1, wherein the comparison unit captures a key frame of the application execution data and sets the captured key frame as the reference image.

3. The application error detection apparatus of claim 2, wherein the comparison unit captures a matching screen from the application execution data output from the at least one virtual client module and sets the captured screen as the reference image.

4. The application error detection apparatus of claim 3, wherein the comparison unit captures a matching key frame from key frames of the application execution data output from the at least one virtual client module and sets the captured key frame as the reference image.

5. The application error detection apparatus of claim 1, wherein the at least one virtual client module outputs the application execution data including only a key frame.

6. The application error detection apparatus of claim 5, wherein, the comparison unit captures a matching screen from the application execution data output from the at least one virtual client module and sets the captured screen as the reference image.

7. The application error detection apparatus for a cloud streaming service of claim 1, wherein the comparison unit selects a reference server from among the streaming servers and compares the reference image generated by capturing a test result video corresponding to application execution data of the reference server with test images generated by capturing test result videos corresponding to other streaming servers among the streaming servers.

8. The application error detection apparatus for a cloud streaming service of claim 7, wherein the comparison unit comprises:
a module control unit configured to perform control such that the at least one virtual client module receives test results corresponding to a repetitive test script key input from any one of the streaming servers and generates operation case videos;
an operation case comparison unit configured to compare operation case images generated by capturing the operation case videos; and
a reference generation unit configured to generate the reference region according to a result of the comparison between the operation case images,
wherein,
the reference generation unit detects the region having no differences and generates the region as the reference region by comparing the operation case images, and
the module control unit performs control such that the test results are received from the reference server.

9. The application error detection apparatus for a cloud streaming service of claim 7, wherein the test result images corresponding to the other streaming servers are captured at the same time as the test result image corresponding to the reference server.

10. A cloud streaming server test apparatus comprising:
a test execution unit configured to repeatedly perform a test by automatically and repeatedly executing an automatic testing script corresponding to a test application to be tested according to a predetermined initial condition to execute one or more test applications;
an application control unit configured to increase or decrease the number of applications being executed which is the number of test applications being executed during the test each time the test is repeated; and
an optimal application number calculation unit configured to end the test and calculate the optimal number of executable applications when it is determined that a test end condition is satisfied,
wherein,
the initial condition includes one or more of maximum central processing unit (CPU) utilization, maximum graphics processing unit (GPU) utilization, a check interval of CPU utilization and GPU utilization, the initial number of test applications, the final number of test applications, and a test time,
the test execution unit finds a maximum load point at which system resource utilization is recorded as a maximum value during the test time and resets the test time to a time at which the maximum load point is reached,
the system resource utilization is determined in consideration of one or both of the CPU utilization and the GPU utilization,
the test execution unit enters an application increasing test mode when the initial number of test applications is smaller than the final number of test applications,
the application increasing test mode repeats the test while increasing the number of applications being executed when it is determined that the test end condition is not satisfied,
the test end condition is satisfied when the CPU utilization and the GPU utilization are greater than a maximum CPU utilization and a maximum GPU utilization, respectively, or when the number of applications being executed is equal to the final number of test applications during the test time, and
the optimal number of executable applications is equal to one less than the number of applications being executed when the test end condition is satisfied.

11. The cloud streaming server test apparatus of claim 10, wherein,
the test execution unit enters an application decreasing test mode when the initial number of test applications is greater than the final number of test applications,
the application decreasing test mode repeats the test while decreasing the number of applications being executed when it is determined that the test end condition is not satisfied,
the test end condition is satisfied when the CPU utilization and the GPU utilization are equal to or less than the maximum CPU utilization and the maximum GPU utilization, respectively, or when the number of applications being executed is equal to the final number of test applications during the test time, and
the optimal number of executable applications is equal to the number of applications being executed when the test end condition is satisfied.

* * * * *